(12) United States Patent
Nugent, Jr. et al.

(10) Patent No.: US 11,368,054 B2
(45) Date of Patent: Jun. 21, 2022

(54) REMOTE POWER SAFETY SYSTEM

(71) Applicant: LASERMOTIVE, INC., Kent, WA (US)

(72) Inventors: Thomas J. Nugent, Jr., Bellevue, WA (US); Jordin T. Kare, San Jose, CA (US); Alexander Hay, Bellevue, WA (US)

(73) Assignee: LaserMotive, Inc., Kent, WA (US)

( * ) Notice: Subject to any disclaimer, the term of this patent is extended or adjusted under 35 U.S.C. 154(b) by 844 days.

(21) Appl. No.: 16/079,073

(22) PCT Filed: Feb. 22, 2017

(86) PCT No.: PCT/US2017/018980
§ 371 (c)(1),
(2) Date: Aug. 22, 2018

(87) PCT Pub. No.: WO2017/147206
PCT Pub. Date: Aug. 31, 2017

(65) Prior Publication Data
US 2019/0064353 A1    Feb. 28, 2019

Related U.S. Application Data

(60) Provisional application No. 62/298,405, filed on Feb. 22, 2016.

(51) Int. Cl.
*H02J 50/30* (2016.01)
*H02J 50/60* (2016.01)
(Continued)

(52) U.S. Cl.
CPC ............ *H02J 50/30* (2016.02); *H02J 50/60* (2016.02); *H04B 10/807* (2013.01); *G01S 17/66* (2013.01)

(58) Field of Classification Search
CPC .......... H02J 50/30; H02J 50/60; H04B 10/807
See application file for complete search history.

(56) References Cited

U.S. PATENT DOCUMENTS

2004/0227057 A1* 11/2004 Tuominen ............ H04B 10/807
250/205
2004/0266367 A1* 12/2004 Tuominen ............ H04B 10/807
455/91

(Continued)

FOREIGN PATENT DOCUMENTS

DE    102013114773 A1 *  6/2015  .............. H02J 50/60

OTHER PUBLICATIONS

International Search Report, dated Jul. 31, 2017, for International Application No. PCT/US2017/18980, 6 pages.

*Primary Examiner* — Rexford N Barnie
*Assistant Examiner* — David A Shiao
(74) *Attorney, Agent, or Firm* — Seed Intellectual Property Law Group LLP

(57) ABSTRACT

A power beaming system delivers electric power in laser light from a first location to a remote second location. The laser light has a high energy intensity level defining a hazardous illumination area and a low energy intensity level defining a safe illumination area. The system includes guard circuitry emitter(s) and corresponding detector(s). The guard circuitry forms a detection area about the hazardous illumination area to detect objects in proximity to the hazardous illumination area. A controller directs the guard and power beam circuitry according to sequentially activated safety modes to operate at a low energy intensity level, to scan in a defined pattern, to adjust operation of the detector(s), and to set guard circuitry parameters based on a time value, an object detection value, or a change to the delivered electric power. An output coupled to the controller and power beam (Continued)

circuitry controllably permits or prevents operation at the high energy intensity level.

9 Claims, 9 Drawing Sheets

(51) Int. Cl.
*H04B 10/80* (2013.01)
*G01S 17/66* (2006.01)

(56) References Cited

U.S. PATENT DOCUMENTS

| | | |
|---|---|---|
| 2010/0012819 A1 | 1/2010 | Graham |
| 2010/0079005 A1 | 4/2010 | Hyde et al. |
| 2017/0018976 A1* | 1/2017 | Mor ........................ H02J 50/60 |
| 2017/0093228 A1* | 3/2017 | Fisher .................... H02J 7/025 |

* cited by examiner

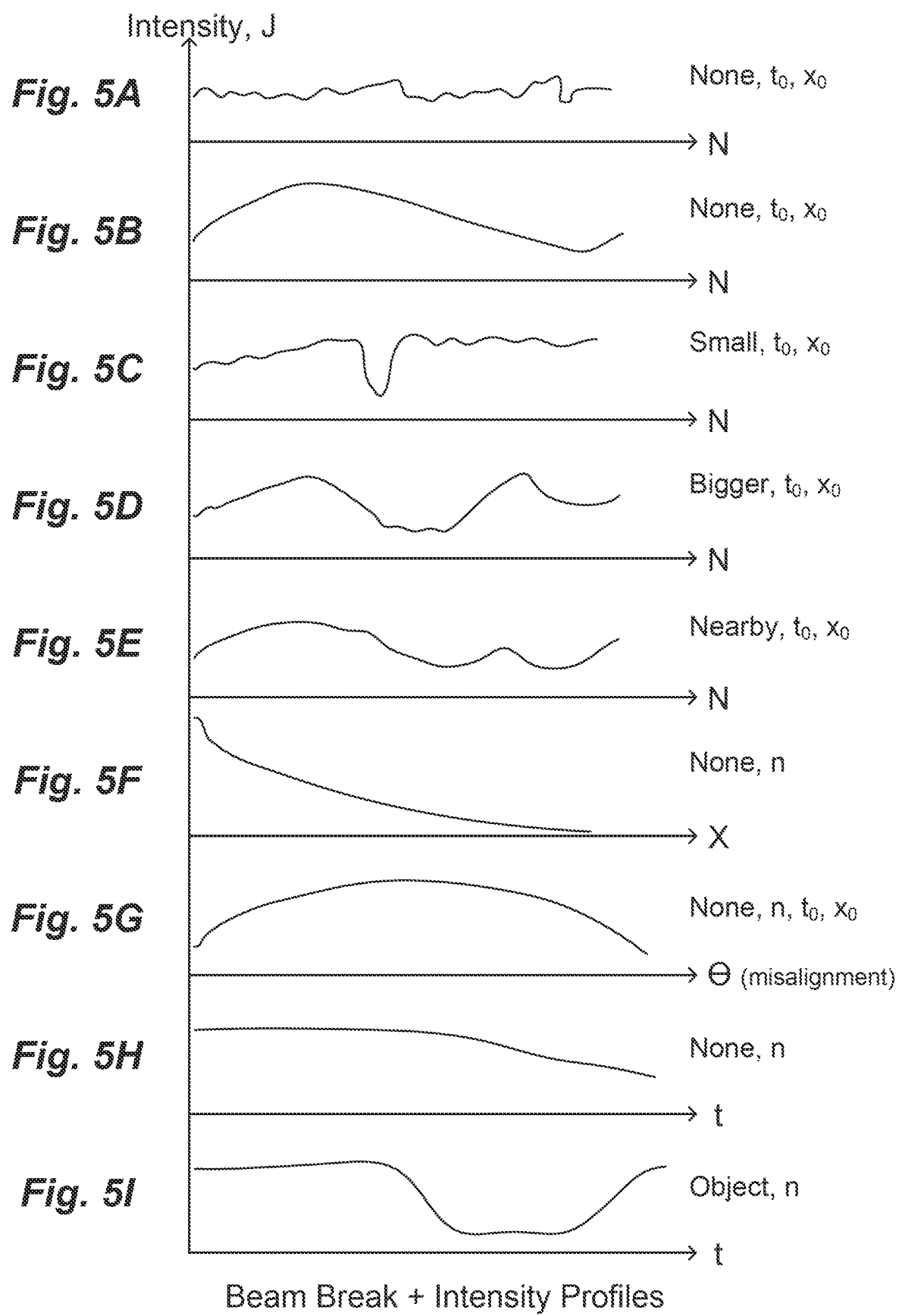

REMOTE POWER SAFETY SYSTEM

BACKGROUND

Technical Field

The present disclosure generally relates to one or a plurality of safety systems working cooperatively with one or a plurality of remote power systems. More particularly, but not exclusively, the present disclosure relates to methods, devices, systems, and other means arranged to protect life, health, and property that may otherwise be affected by a high-energy power beam or field.

Description of the Related Art

One form of remote power is a laser power beaming system. A laser power beaming system, also called an optical wireless power system, includes at least one transmitter (TX) and at least one receiver (RX). FIG. 1 illustrates a conventional laser power beaming system 10 having a transmitter 20 and a receiver 30. The transmitter 20 forms a high-energy beam of laser light 40, which is projected through the air over a distance toward the receiver 30. The receiver 30, which may be in a remote area having an absence of easily available power, includes a light reception module 31 to receive the high-energy beam of laser light 40. At the receiver 30, the laser light 40 is converted to usable electric power, which is transported to one or more circuits 50 where the power is consumed.

In FIG. 1, the transmitter 20 includes a laser assembly 21, which converts electric power into optical power (i.e., light), typically but not necessarily in the near-infrared (NIR) portion of the optical spectrum wavelength between 0.7 and 2.0 µm. The laser assembly 21 may comprise a single laser or multiple lasers, which may be mutually coherent or incoherent. In some cases, the one or more lasers may be replaced by one or more light emitting diodes (LEDs), superradiant diodes, or some other high-intensity light source. The light energy output of the laser assembly 21 passes through various optical elements (e.g., optical fibers, lenses, mirrors, etc.) which convert the raw laser light to a beam of a desired size, shape, for example, circular or rectangular, power distribution, and divergence. Various elements of the laser assembly 21 also aim the light energy beam toward the receiver 30.

After leaving the transmitter 20, the high energy light beam travels through free space toward the receiver 30. The term, "free space," as it is used in the present disclosure, means any reasonably transparent medium such as air or vacuum, water, gas, and the like. Free space is distinguished from a mechanical medium such as an optical fiber or conduit that confines or encloses a high energy light beam or field. Within the present disclosure, a free space path may include one or more mirrors, lenses, prisms, or other discrete optical elements that redirect or alter particular characteristics of the high energy light.

At the receiver 30, the high energy optical beam impinges the light reception module 31. Energy from the high energy optical beam is captured, either directly or via collecting optics such as lenses or mirrors, and converted at least partly back to another form of useful power. In some cases, the light reception module 31 includes an array of photovoltaic (PV) cells which convert light to direct current (DC) electricity. In other cases, the light reception module 31 converts light to electricity in other ways, for example by converting the optical power to heat, which drives a heat engine (e.g., Stirling engine, turbine), a thermoelectric device, or some other device.

In some conventional laser power beaming systems, either the transmitter 20 or the receiver 30 or both the transmitter 20 and receiver 30 may be moving. For example, the transmitter 20 may be mounted on a truck or aircraft, or the receiver 30 may be mounted on an unmanned aerial vehicle (UAV or "drone").

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

In some embodiments of the inventive concepts described herein, a plurality of sequentially activated safety systems or modes is provided. A first level of safety devices and methods is operated to detect a first caliber of objects such as large objects, objects that are generally easier to detect, objects near a more hazardous portion of a high energy laser beam, and the like. After operating the first level of safety devices, a second level of safety devices and methods is operated to detect a second caliber of objects. The second caliber of objects may be further from the laser source, more difficult to detect, or otherwise not included in the first level safety features. A third and any number of additional levels of safety features may then be carried out until a desired level of safety is determined.

In some additional embodiments of the inventive concepts described herein, a free space laser link with one or more failsafe devices and methods is provided. In the embodiments, a high energy beam or field is provided, and one or more emitter/detector pairs provide a system that detects intrusion into an area of hazard associated with the high energy beam or field.

In some further embodiments of the inventive concepts described herein, devices and methods that improve on conventional beam break safety systems are provided. In the further embodiments, a patterned plurality of emitter/detector pairs produce energy beams or fields around a high energy beam or field that has an associated area of hazard. Data collected by the patterned plurality of detectors is grouped, stored, and processed so that particular patterns associated with objects approaching or entering the area of hazard can be identified.

In a first exemplary embodiment, a power beaming system includes power beam circuitry, guard circuitry, a controller and an output. The power beam circuitry is arranged to deliver electric power embodied in laser light beamed from a first location to a second location. The first and second locations are remote from each other. The laser light has at least two energy intensity levels; a high energy intensity level defining a hazardous illumination area and a low energy intensity level defining a safe illumination area. The guard circuitry has at least one emitter and at least one detector corresponding to the at least one emitter. The guard circuitry is arranged to form a detection area about the hazardous illumination area, and the guard circuitry is arranged to detect one or more objects in proximity to the hazardous illumination area. The controller is arranged to direct the guard circuitry and the power beam circuitry according to a plurality of sequentially activated safety modes. The plurality of sequentially activated safety modes include first, second, third, and fourth sequentially activated safety modes. The first sequentially activated safety mode is configured to set parameters of the power beam circuitry to operate at the low energy intensity level, the second sequentially activated safety mode is configured to set parameters of the guard circuitry to scan the detection area in a defined pattern, the third sequentially activated safety mode is configured to set parameters of the guard circuitry to adjust operation of the at least one detector, and the fourth sequentially activated safety mode is configured to dynamically set parameters of the guard circuitry based on at least one time value, at least one object detection value, or a change to the delivered electric power. The output of the first embodiment is coupled to the controller and the power beam circuitry. The output is arranged to controllably permit or prevent operation of the power beam circuitry at the high energy intensity level based on at least one parameter set by the plurality of sequentially activated safety modes.

In at least some cases of the first embodiment, an energy intensity level of the laser light is determined at least in part by a voltage, a current, or the voltage and the current applied to produce the laser light. In at least some cases, the power beam circuitry includes a transmitter module arranged to produce a laser light beam that is controllably aimed at a fixed position laser light receiver, controllably tracked to a moving laser light receiver, or controllably directed in a scanning pattern.

In at least some cases of the first embodiment the hazardous illumination area is determined at least in part by a distance from a transmitter of the beamed laser light. In at least some cases of the first embodiment, the safe illumination area is determined at least in part by controlling at least one of average power, peak power, duty cycle, or pulse width of the beamed laser light. In at least some cases of the first embodiment an energy intensity level of the beamed laser light is determined at least in part by a wavelength light produced by the power beam circuitry. And in at least some cases of the first embodiment, the safe illumination area is controlled at least in part by reducing output flux of the beamed laser light, by increasing a diameter of the beamed laser light, or by increasing a divergence of the beamed laser light.

In at least some cases of the first embodiment, the power beam circuitry includes a laser light receiver to receive the beamed laser light, wherein the laser light receiver includes at least one photovoltaic structure. In at least some of these cases, circuitry of the laser light receiver forms at least part of the at least one detector of the guard circuitry.

In at least some cases of the first embodiment, the power beaming system is at least one of a Light Detection and Ranging (LIDAR) system, a Doppler LIDAR system, a remote chemical sensor system, laser communications system, and a laser power beaming system. And in at least some cases, the at least one time value of the fourth sequentially activated safety mode is associated with system startup, a fixed time interval, or a specific event.

In a second exemplary embodiment, a laser transmission system has a failsafe link that includes at least one emitter of a coded signal and at least one detector of the coded signal. The at least one detector corresponds to the at least one emitter. The laser transmission system also includes a control system coupled to the at least one emitter and the at least one detector, and an output coupled to the control system. The output is arranged to controllably permit or prevent operation of a laser light source in a hazardous mode.

In at least some cases of the second embodiment, the coded signal is a light based signal. In as least some cases, the at least one emitter of the coded signal includes a plurality of emitters formed in a defined pattern about the laser light source. In at least some cases of the second embodiment, the at least one detector of the coded signal includes a plurality of detectors, and each one of the plurality of detectors corresponds to a respective one of the plurality of emitters. In these cases, each emitter is configured to emit a distinguishably different coded signal from each other emitter. In at least some of these, cases, the control system is arranged to assert a disable signal on the output when at least one of the distinguishably different coded signals is not received by a corresponding one of the plurality of detectors.

In a third exemplary embodiment, a laser system passes laser light from a first location to a second location that is remote from the first location. The laser system includes at least one guard beam emitter arranged to emit a guard beam toward at least one corresponding guard beam detector. The laser system includes a non-transitory computer-readable storage medium whose stored contents configure a computing system to perform a method. In these cases, the method includes storing at least one optical intensity profile that defines guard beam light received by the at least one corresponding guard beam detector over time. The method also includes detecting a change in guard beam light received by the at least one corresponding guard beam detector based on a comparison of current guard beam light received by the at least one corresponding guard beam detector and values stored in the at least one optical intensity profile. The method also includes disabling the laser light passed from the first location to the second location based on the detected change in guard beam light.

In at least some cases of the third embodiment, the method further includes storing a plurality of optical intensity profiles. Here, at least one of the plurality of optical intensity profiles defines a size of an object detected in proximity to the laser light passed from the first location to the second location. In at least some cases, the method further includes storing a plurality of optical intensity profiles, wherein at least one of the plurality of optical intensity profiles defines information used to approximate a distance of a detected object from the first location or from the second location.

In at least some cases of the third embodiment, the method further including a calibration. The calibration includes measuring a first value produced by the at least one corresponding guard beam detector, moving a known object between the at least one guard beam emitter and the at least one corresponding guard beam detector, measuring a second value produced by the at least one corresponding guard beam detector when the known object is between the at least one guard beam emitter and the at least one corresponding guard beam detector, and storing information representative of the first value and the second value in the at least one optical intensity profile.

This Brief Summary has been provided to introduce certain concepts in a simplified form that are further described in detail below in the Detailed Description. Except where otherwise expressly stated, the summary is not intended to identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIGS. 5A-5I illustrate plotted data representing signals measured with a detector module;

DETAILED DESCRIPTION

Figure 1:
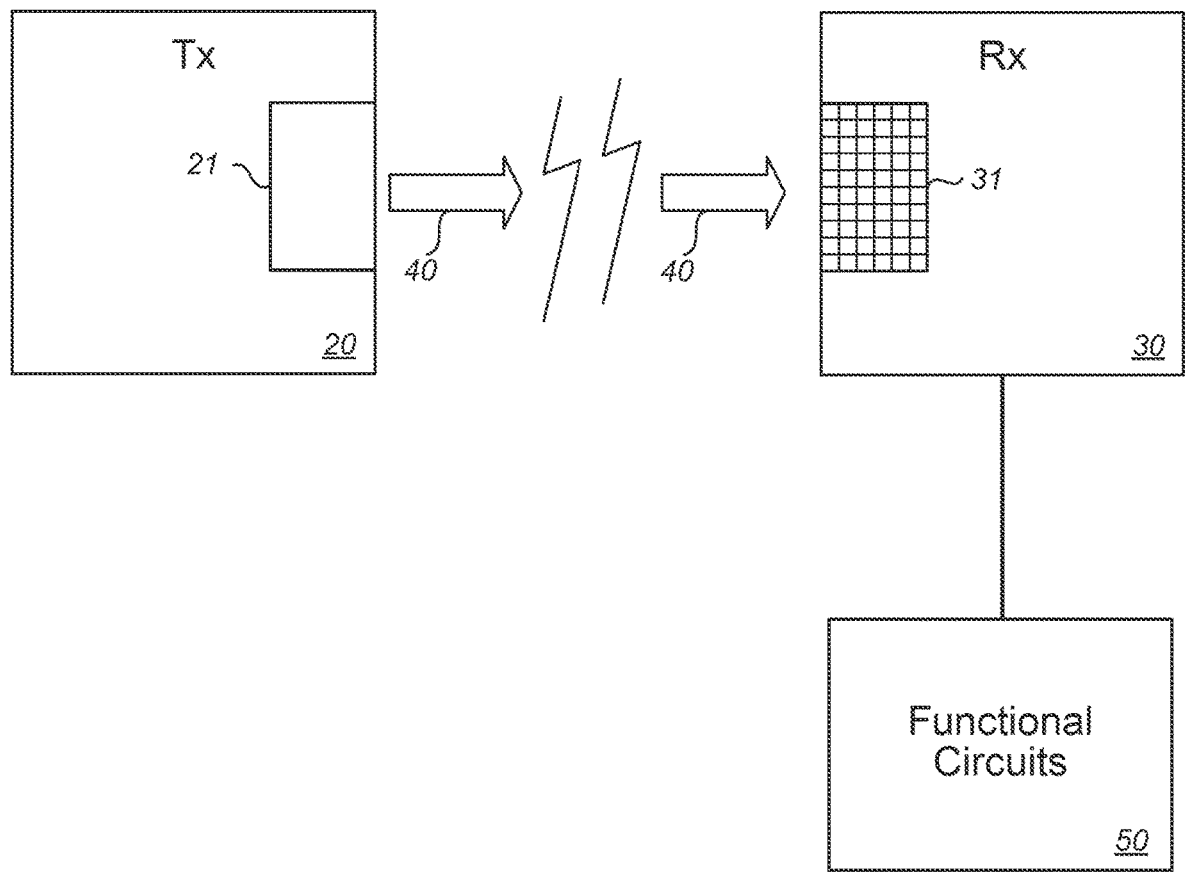
FIG. 1 is a conventional laser power beaming system having a transmitter and a receiver.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

Prior to setting forth the embodiments however, it may be helpful to an understanding thereof to first set forth definitions of certain terms that are used hereinafter.

The term, "free space," as it is used in the present disclosure, means any reasonably transparent medium such as air or vacuum, water, gas, and the like. Free space is distinguished from a mechanical medium such as an optical fiber or conduit that confines or encloses a high energy light beam or field. Within the present disclosure, a free space path may include one or more mirrors, lenses, prisms, or other discrete optical elements that redirect or alter particular characteristics of the high energy light.

The term power beam is used, in all its grammatical forms, throughout the present disclosure and claims to refer to a high energy light transmission that may include a field of light, that may be generally directional, that may be arranged for steering/aiming to a suitable receiver. The power beams discussed in the present disclosure include beams formed by high energy laser diodes or other like sources sufficient to deliver a desirable level of power to a remote receiver without passing the power over a conventional electrical conduit such as wire.

In the present disclosure, the term "light," when used as part of a safety system such as a guard beam, refers to electromagnetic radiation including visible light, ultraviolet light, and mid- or short-wavelength infrared light. Shorter or longer wavelengths, including soft X-rays and thermal infrared, terahertz (THz) radiation, or millimeter waves, are also considered to be light within the present disclosure when such light can be reflected, blocked, attenuated, or otherwise used to detect obstacles of the sizes and compositions of interest.

The term "guard beam" refers to a light-based system deployed in proximity to a high energy power beam and arranged as one or more portions of a safety system. The guard beam may be formed as a light beam or field at a power level that is comparatively low (e.g., at or below an ANSI Z136.1 standard regulatory limit, at or below an IEC 60825-1 standard regulatory limit, or at or below another like acceptable limit) with respect to the high energy power beam or some other hazardous region. The interruption of a guard beam may be used to indicate the presence of an unsafe object. The interruption of a guard beam may generate one or more control signals that are used to prevent, extinguish, disable, block, or otherwise control the high energy power beam or other hazard. For example, interruption of a guard beam may generate a control signal used by a safety system to shut down a high energy power beam transmitter. In some cases the guard beam may only be partially interrupted. For example, in some cases, one or more foreign objects may reflect light as a side reflection that is at the edges of the emitted sensor beam(s) or from sensor light that is scattered in the air. In other cases, the guard beam may be fully interrupted causing a direct reflection due to one or more foreign objects being completely between an emitter and a detector.

In the present disclosure, a source for a guard beam is referred to as an "emitter." The term emitter is distinguished from the term, "transmitter," which indicates a source of a high energy power beam. Along these lines, the detection module for a guard beam includes a "detector." The term "detector" is distinguished from the term, "receiver," which indicates a reception module for a high energy power beam. Emitters and/or detectors may include various electronic, optical, mechanical, electromechanical, and other components in addition to a light source and a photodetector, respectively, and said components are not described herein for brevity. For example, suitable guard beam light sources, photodetectors, optical components (e.g., reflectors, lenses, filters, and the like) for visible and non-visible wavelengths are familiar to those of ordinary skill in the use of such wavelengths and not described herein.

The present invention may be understood more readily by reference to the following detailed description of the preferred embodiments of the invention. It is to be understood that the terminology used herein is for the purpose of describing specific embodiments only and is not intended to be limiting. It is further to be understood that unless specifically defined herein, the terminology used herein is to be given its traditional meaning as known in the relevant art.

In many cases, the spectral flux (W/m$^2$) in an optical high energy power beam is substantially above the safe limit for exposure to living tissue such as a human or animal eye. In some cases, the flux is high enough to cause eye damage and/or other non-eye damage such as burns or other changes to living tissue. It is thus important to detect when people, animals, or other objects are in or will imminently enter the high energy beam path during the time the beam is activated. In these and other cases, it may also be important to deter and/or prevent people, animals, and objects from entering the beam path while the beam is activated or will soon be activated.

In addition to direct exposure to a high energy power beam, hazardous amounts of light may be reflected specularly or diffusely by objects in, or passing through, the power beam. In some cases the high energy power beam may be intense enough to ignite flammable objects (e.g., paper, cardboard). Thus, unless the beam path is generally inaccessible to objects and living beings (e.g., in outer space), a laser power beaming system is improved by including a safety system arranged to detect hazards, including objects in or near the high energy beam path, and to shut off the high energy power beam or prevent the high energy power beam from being activated or otherwise propagated in an unsafe way.

In general, embodiments of safety systems described herein may include multiple subsystems or mechanisms for detecting hazards, controlling the high energy power beam activation, and otherwise providing safety features. Some of the embodiments provide redundant or overlapping coverage.

In some safety system embodiments described herein, the high energy power beam is shut off at the source (e.g., by commanding a power supply to turn off). In some safety system embodiments described herein, the high energy power beam is blocked (e.g., with a mechanical or electronic shutter). In still other safety system embodiments described herein, the interaction between the high energy power beam and one or more objects is detected and/or prevented in other ways.

Some safety systems are employed in connection with other hazards that cannot easily be protected by physical barriers. Optical "fences" are used, for example, to detect when operators reach into hazardous areas around machinery. These other safety systems are very different from the safety systems described herein, however, because high energy power beams are very different from other types of dangerous machines. For example, laser power beaming systems are exceptional in the need for very rapid response to small objects due to the possibility of hazardous reflections over a long distance. Improved safety sensors are therefore of high value for power beaming, although they may be useful in other applications as well.

Certain laser-based systems are used to remotely sense data and generate information. Some of these laser-based remote sensing systems, for example, transmit laser light in a divergent or scanned (i.e., moving) beam and detect reflected or scattered light. One such system is a LIDAR (Light Detection And Ranging) system, which is used to sense the location or motion of objects for safety purposes. Another LIDAR-based system is Doppler LIDAR, which implements a plurality of wind velocity sensors. Generally speaking, LIDAR-based systems that operate close to the ground or where live beings may otherwise be in the vicinity are operated with lower energy lasers that do not present risk of eye-injuries.

In some cases, however, it is necessary or desirable to design and operate a laser-based system such that a transmitted beam or field is potentially hazardous. In these cases, the laser power may exceed regulatory limits such as those provided in the ANSI Z136.1 standard, the IEC 60825-1 standard, or some other directive specification. When the laser is energized, the hazard caused by the high energy beam or field may be present out to some distance from the source. The distance from the source to the point or distance at which the energy level of the laser falls below the regulatory limit or is otherwise deemed "safe" is called the nominal ocular hazard distance or NOHD. Accordingly, beyond the NOHD, the transmitted beam is considered safe.

In other cases, a laser-based optical sensing system, communications system, or power transmission system may transmit a laser beam which is potentially hazardous only in certain areas. For example, the laser source may transmit a high energy beam over most of its path or its entire path, but the high energy beam may only represent an actual hazard over a limited range of its path near the laser source because most of the path is inaccessible. The laser path may be inaccessible because the path is far above the ground, because the path is protected by a safety system such as a radar sensor that has a minimum working range, or for some other reason.

Sequential Active Optical Safety Systems

One set of embodiments now described include embodiments that provide for a plurality of sequentially activated safety systems or modes. In these embodiments, a first level of safety devices and methods is operated to detect large objects, objects that are generally easier to detect, objects near a more hazardous portion of a high energy laser beam, and the like. After one or more first level safety features are validated safe, a second level of safety devices and methods is operated. The second level safety features may be further from the laser source, more difficult to detect, or otherwise not included in the first level safety features. A third and any number of additional levels of safety features may then be carried out until a desired level of safety is determined.

Embodiments described in the present disclosure permit the safe use of potentially hazardous high energy laser transmitters by employing certain portions of the system to provide one or more safety features. For example, in some embodiments, the laser transmitter itself is selectively operated at reduced power or otherwise in a safe mode (e.g., pulsing, diverging a beam into a wider angle, changing operating parameters, or taking other such actions). In these and in other embodiments, the laser transmitter is operated using a lower or otherwise safer energy output, in conjunction with a suitable detector, to sense the presence of objects such as people in or near a region of potential hazard. In these safety embodiments, the system is operated in one or more lower power safety modes prior to operating the system at full power or intermittently during normal operation.

Figure 2:
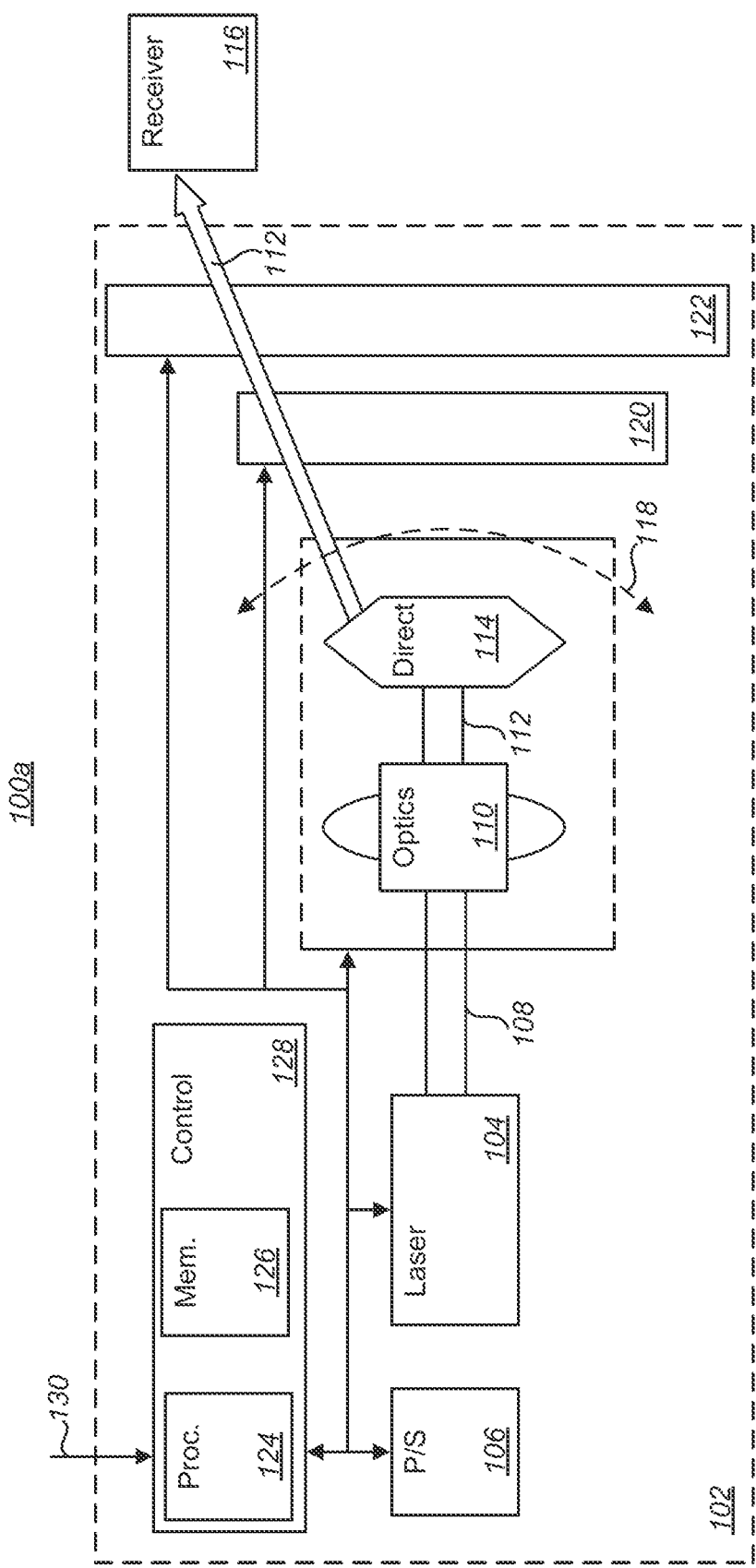
FIG. 2 is a laser-based system embodiment.

FIG. 2 is laser-based system embodiment 100a. The laser-based system embodiment may be arranged as a remote sensing system, a communications system, a power beaming system, or some other high energy laser-based system. The laser-based system embodiment 100a is configured with a transmitter portion 102 that generally comprises a laser module 104 driven by a power supply module 106. The high energy light output 108 of the laser module 104 passes through a beam shaping optics module 110, which produces a high energy beam 112 of the desired dimensions and divergence. The high energy beam 112 is a collimated beam in many embodiments, but in some cases, the high energy beam 112 may be formed to diverge at a desired angle or converge to focus at a desired range. After exiting the beam shaping optics module 110, the high energy beam 112 then passes through an optional beam director module 114, which aims the high energy beam 112 in a desired direction. In some cases, a beam director module 114 may include one or more structures (e.g., screws, bolts, brackets, or the like) to mechanically affix the direction of the high energy beam 112 in a desired direction. In these types of embodiments, the high energy beam 112 may be aimed during installation, service, or calibration of the laser-based system embodiment 100a and remain generally fixed thereafter. In other cases, the beam director module 114 may include electrical, electromechanical, or some other mechanism to direct or steer the high energy beam 112.

In some cases, the high energy beam 112 is directed at a receiver 116 of a power system, communications system, or some other type of system. In some cases, the high energy beam 112 is scanned over a desired field of view 118 (e.g., a conical or raster scan). In some embodiments the beam shaping optics module 110 and the beam director module 114 may be combined into a single module.

In some systems, a detector module 120 may be associated with the laser module 104 of transmitter portion 102. The detector module 120 may share some or all of the circuits and other features of the beam shaping optics module 110 and the beam director module 114. In this way, the line of sight of the detector module 120 is along the path of the high energy laser beam 112.

The detector module 120 may operate at the same wavelength as the laser module 104, at a different wavelength from the laser module 104, or at a plurality of wavelengths. In some cases, a substantially exact operating wavelength range of the detector module 120 is set by one or more filters of a filtering module 122 in the optical path leading to the detector module 120.

The detector module 120 may be configured to detect reflected or backscattered light from the high energy laser beam 112. In some cases, the reflected or backscattered light has a wavelength shift. In these or in other cases, the detector module 120 is configured to detect some other signal such as a tracking beacon, an incoming communications laser beam (not shown), or some other communications information.

The laser-based system embodiment 100a of FIG. 2 includes a processing module 124, memory 126, and other operative computing modules (not shown). In this respect, the laser-based system embodiment 100a is a computing device having a control circuit 128 arranged to carry out operations according to a plurality of software instructions. The control circuit 128 includes the processing module 124 and the memory 126, which stores the software instructions and operative computing data.

Various embodiments of the laser-based system 100a illustrated in FIG. 2 are arranged to include some or more of the following features now described.

A first feature is a safe beam operating mode, including a control input 130, which directs operations of a safe mode of the transmitter portion 102. The control input 130 is arranged to direct changes to the operating parameters of the transmitter portion 102. For example, in some cases, the control input 130 directs changes to operating parameters (e.g., current, voltage, pulse width, pulse repetition rate, and the like) of the laser power supply module 106. In these or other cases, the control input 130 is arranged to direct changes to the operating parameters (e.g., wavelength, output power, polarization, and the like) of the laser module 104. In still other cases, the control input 130 will additionally or alternatively direct changes to the operating parameters of the beam shaping optics module 110 and or beam director module 114 (e.g., by introducing an attenuating filter to reduce the beam power, by inserting or moving one or more lenses to change the beam diameter, beam divergence, or other beam properties, by imposing a shield having a fixed or variable opacity in the beam path, or by making other like changes). Still other operations are also contemplated at the direction of a control input 130, which may be a single signal, a plurality of signals, or some other control input.

In FIG. 2, the control input 130 is illustrated as an input to the control circuit 128. Some or all of the signals represented by the control input 130 may optionally originate from inside of the laser-based system embodiment 100a, from outside of the laser-based system embodiment 100a, or from both inside and outside of the laser-based system embodiment 100a. Along these lines, some or all of the signals represented by the control input 130 may optionally originate from inside, outside, or both inside and outside of the transmitter portion 102, the control circuit 128, the laser module 104, the power supply module 106, or one or more other modules.

In one embodiment, the transmitter portion 102 is configured to generate a high energy beam 112 at a first comparatively safe wavelength and at a second normal operating wavelength, which may damage living tissue or be otherwise unsafe for other reasons. One example of a comparatively safe wavelength is a high energy beam 112 produced at 1500-2000 nm along with the second or third harmonic thereof. The generation of such a high energy beam 112 produced at 1500-2000 nm is considered to be an "eye-safe" light. In this and in other embodiments, the actual wavelength of the high energy beam 112 may be selected by a filter inside, external to, or otherwise associated with the laser cavity of the laser module 104. In some cases, a separate laser source associated with the laser module 104 is provided to generate the high energy beam 112 at an eye-safe wavelength. This second laser source may be used for the safe beam operating mode.

Figure 3C:
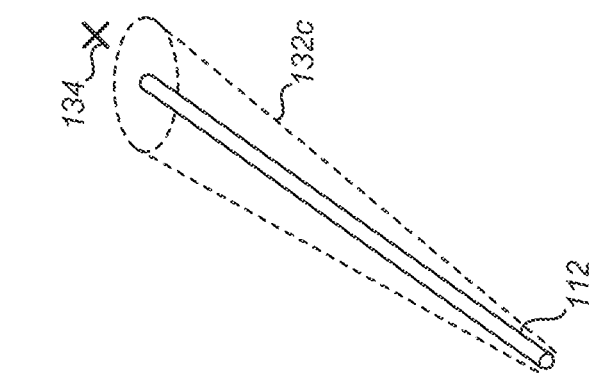
FIGS. 3A-3C illustrate exemplary safety-check beam director operating mode embodiments.
Figure 3B:
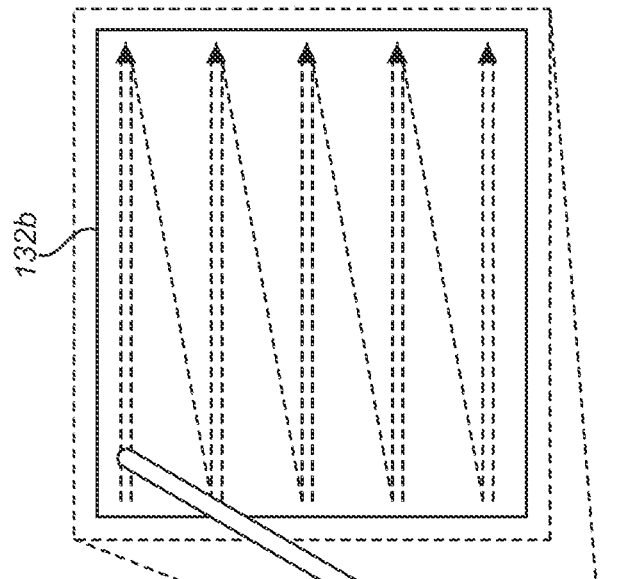
Figure 3A:
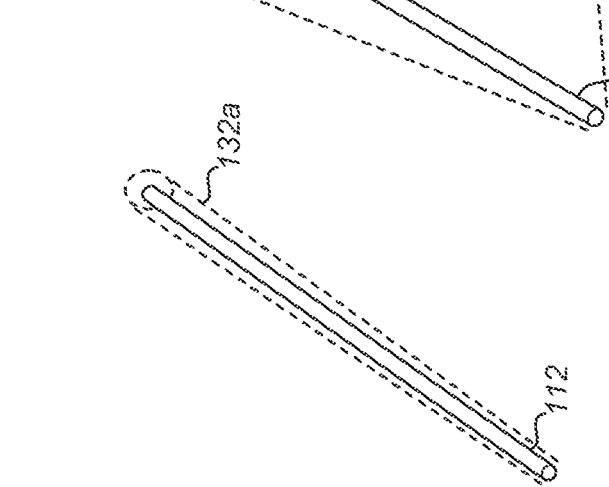

A second feature that may be implemented in a laser-based system embodiment 100a is a safety-check beam director operating mode. FIGS. 3A-3C illustrate exemplary safety-check beam director operating mode embodiments. One or more safety-check beam director operating modes may be implemented to scan and detect objects that are in an area around a high energy beam, are predicted to be in the area around a high energy beam, are in an area where a high energy beam is calculated or predicted to be, or are determined will suffer or cause adverse effects if remedial or other interventional action with respect to the high energy beam is not taken.

In many cases, a safety-check beam director operating mode scans a guard beam axis in a conical path around a high energy beam axis. FIG. 3A illustrates a first guard beam 132a formed in a conical path around a high energy beam 112 that is normally fixed. FIG. 3B illustrates a second guard beam 132b that is formed around the outside of the normal system scanning or tracking field of a high energy beam 112 that normally scans or tracks over some range of angles. Other scan patterns for a guard beam and high energy beam are possible, however, including no scanning if the high energy beam 112 safely diverges sufficiently to cover the desired safety sensing zone.

In some embodiments, parameters of the beam shaping optics module 110 may be adjusted to increase the divergence of the high energy beam 112 to make the high energy beam 112 safe beyond a certain distance. In some embodiments, the scan pattern of a guard beam may be offset from the normal high energy beam axis/center of a scanning field if hazards are expected primarily from certain directions (e.g., from below an elevated horizontal beam path, from above a horizontal beam path, or from some other reference point or direction relative to the actual or predicted position of the high energy beam). FIG. 3C, for example, illustrates a guard beam 132c forming an exemplary elliptical pattern to detect an exemplary object in danger 134 that may suffer or cause adverse effects from a high energy beam 112.

A third feature that may be implemented in a laser-based system embodiment 100a is a safety-check detector. In some embodiments, a safety check detector may be arranged using detector 120 and associated detector optics with alternate hardware settings (e.g., detection thresholds) and/or software signal processing. In other embodiments, a safety check detector may be implemented using detector 120 and associated optics that have been changed (e.g., changing a filter to increase the response to scattered light at the relevant laser wavelength, moving one or more lenses, changing a lens, changing one or more other elements to match the field of view of the detector module 120 to the safe high energy beam divergence, changing the field of view of the detector module 120 to match a high energy beam output operating in a safety-check scan mode, or changing other parameters, structures, or operations). In still other embodiments, the safety-check detector may be formed with a separate detector that receives incoming light via a switched mirror, dichroic beam splitter, or other addition to the optical path. In these other embodiments, the safety check detector analyzes the incoming light to determine if the high energy beam can be safely transmitted.

A fourth feature that may be implemented in a laser-based system embodiment 100a is a safety-mode controller. The safety-mode controller may be implemented in hardware, software, or a combination of hardware and software. Embodiments of the safety-mode controller activate the safety mode under appropriate circumstances (e.g., at system startup, at timed intervals, when the normal beam path or scan pattern changes by a specified amount, or in other circumstances). In these embodiments, and in additional or alternative embodiments, the safety-mode controller processes a detected safety-mode signal to determine if an object which presents a possible safety hazard is present in a determined hazard zone. In some embodiments, the safety-mode controller deactivates the safety mode and authorizes normal system operation of the high energy beam only in the absence of any detected hazards.

The characteristics of a high energy laser beam (e.g., wavelength, pulse width, beam divergence, and the like) for a particular embodiment will generally be much more tightly constrained than the characteristics of a guard beam in a safety system, which may in basic form simply detect light scattered by a limited range of solid objects such as people, animals, birds, aircraft, and other objects.

The safety system features arranged in a laser-based system embodiment 100a are generally configured to perform from a first point at or near the source of the high energy beam 112 out to a useful range. That is, the particular safety feature of the system is generally configured to detect relevant objects including human beings, but possibly also including animals, birds of various sizes, reflective objects above a specified size, aircraft, and other objects. The safety features are configured to detect the relevant objects out to a range that extends a moderate distance beyond the NOHD. For example, a system intended to count insects or to measure scattering from dust particles may have a working range much less than the NOHD, but such a system may be configured to detect reflections from objects the size of a human head or some other size at much larger distances than the working range.

In some embodiments, operating power of a high energy beam may be traded for response time. For example, a particular safety system embodiment may be configured to provide a sub-millisecond response time when in normal operation, and the safety system embodiment may be further configured to integrate for 1 second at a predetermined lower power to establish that the volume of space to be illuminated by the high energy beam is initially clear of obstacles.

In some embodiments, the sensing system, which may be implemented using the detector module 120, filtering module 122, processing module 124, and memory 126 for example, may activate in a known-safe mode. In such embodiments, the activated known-safe mode may vary the safety operating mode continuously or for a predetermined amount of time. For example, the known-safe mode may increase power, but possibly also change one or more other parameters such as the scan rate of a scanning system. In this way, as the range free of detected obstacles increases, the sensing system can "search" for obstacles initially in a short range and then "search" out to longer distances under a different set of parameters that are determined to be safe out to those longer distances.

In other embodiments, the sensing system may operate in two or more modes. For example, in some of the other embodiments, the sensing system may use two or more different laser sources, two or more different scan modes or pulse rates, two or more power levels, two or more wavelengths, or in some other plurality of modes. In these cases, the sensing system may progressively switch continuously or discontinuously from one mode to another having a different NOHD. For example, the operating range of a high energy beam between the source of the high energy beam out to the point or distance at which the energy level of the laser falls below a limit deemed "safe" can be divided into two or more portions. Subsequently, parameters of the sensing system may be arranged, mode-by-mode, to detect objects in each of the established portions such that each portion is cleared before and during the time a high energy beam is transmitted.

In some embodiments, increasing power or switching modes may happen only at system startup or other specific times. In other embodiments, starting from low power and increasing power or switching modes may occur at fixed intervals or upon the occurrence of a determined event. In still other embodiments, a system that operates in a pulsed mode may use a low starting power on every pulse or on some fraction of all pulses.

In some embodiments, a separate safety system, such as a proximity detector, radar, or perimeter fence, may be used to detect or exclude objects or people closer than an initial safe range, such that the lowest-power mode of the laser-based safety or sensing system does not need to be safe below the initial safe range. In these or other embodiments, the laser-based system may be configured such that its lowest power mode meets safety requirements at all ranges, including at the system transmitting aperture.

Free Space Laser Link with Failsafe

Figure 4:
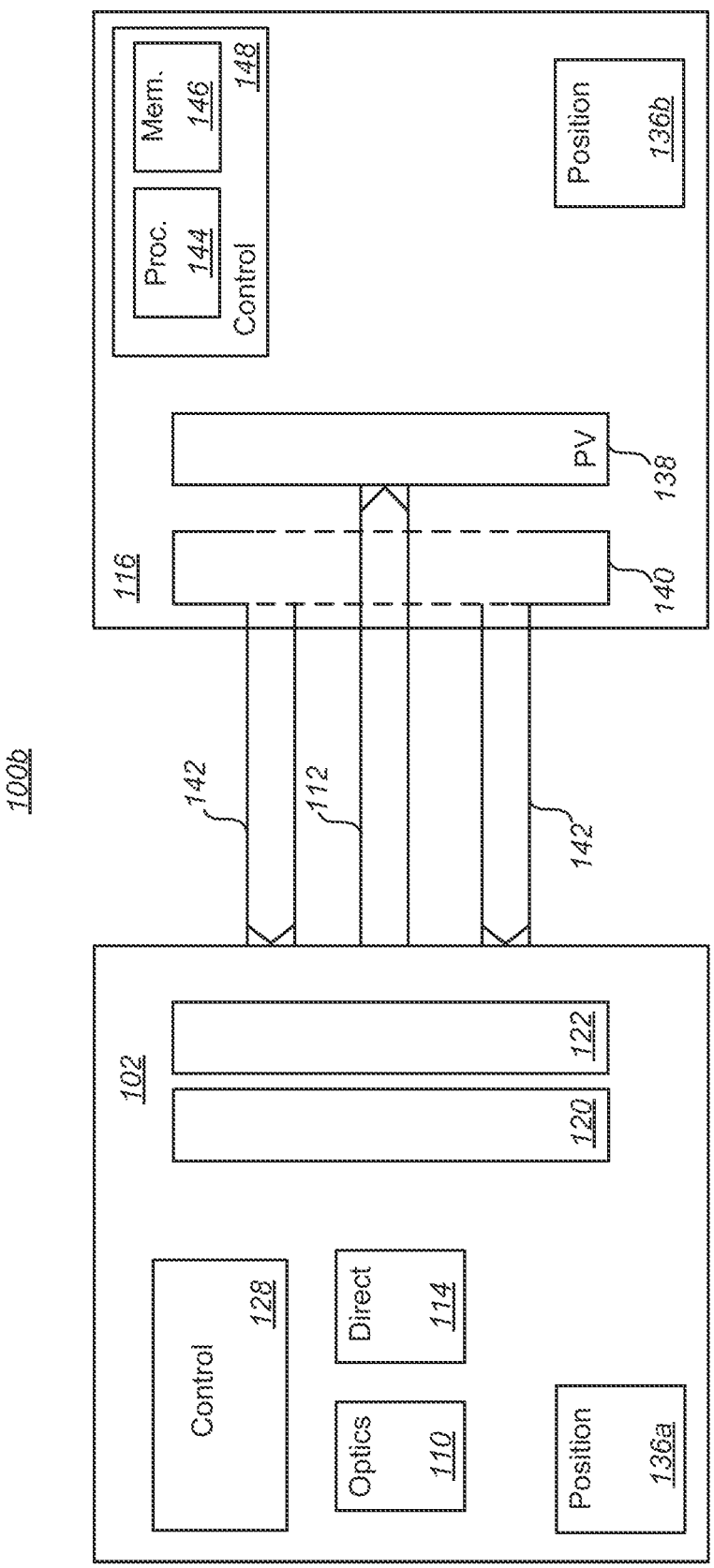
FIG. 4 is another laser-based system embodiment.

FIG. 4 is another laser-based system embodiment 100b, which includes a transmitter portion 102 and a receiver 116. The transmitter portion 102 of FIG. 4 is illustrated as having an optics module 110, a beam director module 114, a detector module 120, a filtering module 122, a control circuit 128, and a position device 136a. The receiver 116 of FIG. 4 is illustrated as having a position device 136b, a photovoltaic module 138, an emitter module 140, and a control circuit 148 that includes at least a processor 144 and memory 146. It is recognized that the transmitter portion 102 and the receiver 116 of FIG. 4 may each include other circuits, components, modules, and the like not shown for simplicity.

With respect to the transmitter portion 102 and receiver 116, it is further recognized that the illustrated structures may be internal, external, integrated with, associated with, or formed in any other configuration with their respective host device.

In an optical wireless power system such as the laser-based system embodiment 100b of FIG. 4, a high energy laser beam 112 is used to transfer power from a transmitter portion 102 to a receiver 116 through free space. The beam intensities employed in such an optical wireless power system may exceed the ANSI safety thresholds for both eye and skin exposure; in some cases by large factors. In some laser-based systems the path of the high energy laser beam 112 will be accessible to people, animals, birds, aircraft, or other objects. In such systems, the object may be hit by the high energy beam 112 and adversely affected, or one or more objects may enter the beam path and undesirably reflect hazardous amounts of light towards people or other objects. Lower power, but still potentially hazardous, laser beams may pass between a transmitter and receiver for optical communications, remote sensing, or other applications.

Embodiments of various safety systems described herein prevent or limit hazardous exposures to high energy, free-space laser beams by detecting objects near or in the beam path and shutting off or preventing activation of the high energy laser beam. Such safety systems may use, for example, radar, LIDAR, optical beam-break sensors, or other workings to detect objects in or near the high energy laser beam path. However, particularly for power beaming systems, there is increased value in providing a safety system that provides very fast shutoff of the high energy laser if the high energy beam path itself is partly or entirely blocked, especially if the system requires no power at the receiver before the system is turned on.

Embodiments discussed herein include a free-space laser transmission system directed toward power beaming, communication, data transmission, remote sensing system, or some other use. The embodiments now discussed include a failsafe link from the laser power receiver 116 to the laser power transmitter portion 102.

In some embodiments, such as the laser-based system embodiment 100b of FIG. 4, a failsafe link is an optical link that includes an emitter module 140 located at the receiver 116. The emitter module 140 may control or otherwise direct operations of an LED, laser diode, or some other light source. In at least some cases, the emitter module 140 transmits a coded signal 142, such as an optical coded signal.

In embodiments now described, the failsafe coded signal 142 may be a light signal (e.g., an optical signal) in the visible, partially-visible, or invisible spectrum. In other embodiments, the coded signal 142 is formed by electromagnetic energy that is outside of the light spectrum, such as a line-of-sight radio frequency (RF) signal, a microwave signal, an audio signal, or some other form of electromagnetic energy. In some embodiments, one or more coded signals 142 in a particular system are formed from a plurality of different energy forms, frequencies, or other characteristics. In some embodiments, one or more coded signals 142 are formed by a single, constant intensity, constant frequency signal. In other embodiments, one or more coded signals 142 are formed with a non-constant intensity, non-constant frequency, or other non-constant characteristics. For example, in some cases, coded signal 142 may be pulsed, varied in amplitude, varied in frequency, or varied in some other way so as to convey useful information between an emitter or structure associated with the emitter and a detector or structure associated with the detector. In other cases, the coded signal is merely a constant signal that does not convey any additional data except as a guard beam that implements some portion of a safety system.

At the transmitter portion 102, an optical detector module 120 detects the coded signal 142 from the emitter module 140. The optical detector module 120 may include a photodiode or another light sensitive device arranged to provide one or more output signals in response to the coded signal 142.

At the receiver 116, a control circuit 148 receives input representing at least one parameter of the receiver 116. In some cases, for example, the input to the control circuit 148 represents power received at the receiver 116 (e.g., by measuring or otherwise detecting one or more current values from the photovoltaic module 138). Based on the power received, for example, or based on other factors, the control circuit 148 may be arranged to control one or more codes transmitted on the failsafe coded signal 142. In at least one embodiment, the control circuit 128 of the transmitter portion 102 is arranged to enable the high energy beam 112 transmission only if the detector module 120 is receiving a failsafe signal with a valid code communicated via the coded signal 142.

The failsafe emitter module 140 at receiver 116 may be fixed, or the emitter module 140 may be configured to point toward or actively track the transmitter portion 102. The tracking may be implemented mechanically, electronically, electromechanically, or via some other means. In some cases, for example, tracking may be implemented by activating one of several LEDs or laser diodes. In other cases, a phased array of LIDAR emitters may be implemented (e.g., emitters developed by Quanergy for automotive phased array LIDAR).

In some embodiments, the failsafe emitter module 140 may be mounted on a mechanical gimbal together with the photovoltaic module 138, which may be a photovoltaic array, an optical collector, or some other light-responsive structure. In alternative embodiments, the emitter module 140 may have a separate gimbal or pointing mechanism, which is different from a system that aims, steers, or otherwise controls the position and/or orientation of the photovoltaic module 138.

In some embodiments, the failsafe emitter module 140 may be steered toward the high energy source of the transmitter module 102 based on known relative coordinates. One or more positioning devices (e.g., a global positioning system (GPS), an inertial navigation system (INS), a compass, or some other positioning device) such as positioning devices 136a and 136b may provide the known relative coordinates. In some cases, a single positioning device 136a, 136b works cooperatively with a control circuit 128, 148, respectively, to calculate, predict, or otherwise determine positional information for the transmitter module 102, the receiver 116, or both the transmitter module 102 and the receiver 116. In other cases, two or more positioning devices 136a, 136b work cooperatively to communicate positioning information to their associated device (i.e., transmitter portion 102 or receiver 116, respectively) or to their counterpart device. That is, in some cases, the positioning device 136a and the positioning device 136b communicate with each other to facilitate efficient steering of the high energy beam 112 between the transmitter portion 102 and the receiver 116. In still other cases, the emitter module 140 may be steered by a pointing subsystem arranged as part of the control circuit 148 to detect or otherwise determine the direction of arrival of the high energy beam 112 or a separate guide beam communicated toward the receiver 116.

In some embodiments, the failsafe coded signal 142 may be sent via line-of-sight radio frequency (RF) or microwave transmission, cable, optical fiber, or by some other means rather than via a free-space optical signal. Generally speaking, however, it would be undesirable if the transmission mechanism of the coded signal 142 introduced significant delay or intermittency in the transmission. Accordingly, transmission of the coded signal 142 via internet or cellular networks would generally not be acceptable.

Along the lines of the mounting system for the emitter module 140, the detector module 120 at the transmitter portion 102 may be similarly or dissimilarly mounted. That is, the detector module 120 may be fixed in some embodiments, and in other embodiments, the detector module 120 may be configured to track the receiver 116 as a whole or some portion thereof such as the failsafe emitter module 140, or some other feature.

In some embodiments, the failsafe detector module 120 may share one or more structures of the transmitter portion 102 with structures that produce the high energy beam 112. For example, the detector module 120 may work cooperatively with the beam director module 114, the beam shaping optics module 110, or some other structure of the transmitter portion 102. In this way, the detector module 120 is aligned with the high energy power beam 112 (e.g., via wavelength division) and bore-sighted with the high energy power beam 112. In other embodiments, the failsafe detector module 120 may be mounted to a common gimbal with the beam director module 114 or otherwise mechanically, electrically, electromechanically, or otherwise pointed substantially parallel to the high energy beam 112.

In one or more of the exemplary embodiments described herein, the failsafe coded signal 142 is a simple train of pulses communicated at a substantially constant repetition rate (e.g., between 1 kpps and 1 Mpps). The control circuit 148 located with the power receiver 116 monitors the electrical power output of the photovoltaic module 138 or some other portion of receiver 116 in real time, on a substantially continual basis, or according to some other monitoring scheme. If the power output decreases, changes, or otherwise indicates a particular anomaly by more than a predetermined amount (e.g., in some embodiments, at least 5%, or at least 10%, or at least 20%, or at least 50%) within a predetermined time (e.g., in some embodiments, within 2 seconds, or within 1 second, or within 250 milliseconds, or within 10 milliseconds, or within 1 millisecond) and/or in one or more certain PV sub-arrays (e.g., in some embodiments, at least 1 sub-array, or at least 20% of the sub-arrays, or at least 50% of the sub-arrays, or at least all except one sub-array, or a subset of sub-arrays that define one or more specific geometric patterns), then the control circuit 148 will perform one or more responsive acts. For example, upon detection of the anomaly, the control circuit 148 may change the pulse rate of the emitter module 140, the control circuit 148 may turn off the emitter module 140, or the control circuit 148 may direct some other action.

A change in emitter module 140 pulse rate or a loss of detection of the pulses by the failsafe detector module 120 at the transmitter portion 102 will in some embodiments cause the control circuit 128 of the transmitter portion 102 to immediately attenuate the high energy beam 112. In some cases, power supply module 106 is directed to reduce or remove power from the laser module 104. In some cases, laser module 104 is directly controlled to stop transmission or reduce the intensity of the high energy beam 112. In some cases, other electrical, mechanical, or electromechanical safety shutoff methods are carried out such as an optical shutter, a crowbar circuit across the power supply, and the like.

In some embodiments, rather than a rudimentary stream of pulses, the emitter module 140 may communicate one or more signals having more complex encodings. The encodings may convey more information about the state of the receiver 116 or the nature of the failure, or the encodings may allow the transmitter portion 102 to distinguish among failsafe coded signals 142 from multiple receivers 116, including those receivers 116 that may be receiving high energy beams from other transmitters (not shown).

In some embodiments, such as where the receiver 116 is a beamed-power receiver, it may not be possible to activate or otherwise operate the failsafe emitter module 140 until the receiver 116 is producing power at some predetermined level, or until the receiver 116 has supplied some predetermined amount of energy (e.g., to charge a battery, a capacitor, or some other charge storage device associated with the receiver 116). Alternatively, or in addition, it may be desirable to leave the failsafe emitter module 140 disabled, deactivated, or turned off until some specific operating parameters are met. For example, it may be desirable to leave the failsafe emitter module 140 in an inactive state until it is determined that the emitter module 140 is aimed at the transmitter portion 102.

In some cases, whether or not the failsafe emitter module 140 is operating, it may be desirable for the control circuit 128 at the transmitter portion 102 to allow the transmitter portion 102 to transmit its high energy beam 112 even if the failsafe coded signal 142 is not present or otherwise outside of acceptable operating limits. For example, in some cases, the transmitter portion may permissibly operate without a failsafe coded signal 142 to establish a high energy power-beaming link that supplies power to the receiver 116. In these cases, and in other cases, the transmitter portion may communicate the high energy beam 112 at reduced power or with different operating parameters until a stable power link is established. In some cases, the high energy beam 112 may be operated at a reduced power or with different parameters until the power link is maintained for some predetermined time. In some cases the failsafe link that includes a coded signal 142 may be operating while the received power at the receiver 116 is very low or unsteady.

In one or more exemplary embodiments, the emitter module 140 will not be turned on until the receiver 116 has produced power output above a predetermined threshold (e.g., in some embodiments, at least 5% of the receiver 116 rated output power, or at least 20% of the receiver 116 rated output power, or at least 50% of the receiver 116 rated output power, or at least 80% of the receiver 116 rated output power) for a predetermined duration (e.g., in some embodiments, at least 10 milliseconds, or at least 100 milliseconds, or at least 500 milliseconds, or at least 1 second).

In some embodiments, the failsafe emitter module 140 at the receiver 116 may serve as, or be integrated with, a tracking beacon which can be used by the transmitter portion 102 to locate and track the receiver 116 aperture.

In some embodiments, the failsafe link may also operate as a link that communicates data between the receiver 116 and the transmitter portion 102. For example, in some embodiments, the emitter module 140 may prepare the coded signal 142 with appropriate modulation to carry either information about the receiver 116 such as instantaneous or average received power, PV module 138 temperature, receiver 116 position information, or any other information. In these or other embodiments, the emitter module 140 may prepare the coded signal 142 with information about the system operation such as the error rate of a data link between the transmitter portion 102 and the receiver 116, information representing a pointing error of the high energy beam 112 relative to the receiver 116 aperture, fault status information, or any other information generated by the receiver 116 or externally supplied.

In some embodiments, the failsafe link may also operate as a beam-break safety system, or a subsystem thereof. For example, the failsafe emitter module 140 may be located in the center of the receiver 116 aperture or photovoltaic module 138, and the failsafe detector module 120 may use the features of some or all of the beam shaping optics module 110, beam director module 114, filtering module 122, or some other transmitter portion 102 module. In these cases, the beam break safety system is arranged such that an object blocking the high energy beam 112 path will also block at least part of the failsafe coded signal 142 beam from reaching the detector module 120. When the coded signal 142 is not properly detected by the detector module 120, the control circuit 128 will direct particular acts. For example, the control circuit 128 may respond to a drop in strength of the coded signal 142 as an indication of the presence of an object in the coded signal 142 beam path. In some embodiments, the emitter module 140 may include multiple failsafe emitters. In some embodiments, the detector module 120 may include multiple detectors. In these and other cases, different emitters may be provided with individually-distinct codes. In these and other cases, a plurality of emitter sources may be arranged to provide multiple beam-break paths (e.g., in a ring around the main power high energy beam 112 path).

Safety Via Optical Intensity Profile

Conventional beam break safety systems, which may also be referred to as "guard" beam systems, detect foreign object intrusion into a protected region when the foreign object blocks light provided by a light source from reaching a detector. However, under some conditions, light diffraction or other undesirable effects may cause some light to reach the detector even though the object blocks the direct line of sight between the light source and the detector. Similarly, a first object that is near the line of sight between the light source and the detector may reflect or scatter light onto the detector even if the direct line of sight is blocked by a second, separate object or another part of the first object. This second case may occur even more often when the first object near the guard beam path is relatively large when compared to the second object that is in the guard beam path. In either case, however, the conventional beam break safety system may fail to detect an object when the object is present between the light source and the detector, near the region protected by the guard beam. Failures such as these are typically referred to as a "false negative" in terms of a detection function or alarm function.

A solution that improves on conventional beam break safety systems is now disclosed. The solution reduces and may eliminate the false negative failure conditions that occur in conventional safety systems. In some embodiments, the solution is implemented in one or more structures of the transmitter portion 102 and receiver 116 of FIGS. 2 and 4.

The present disclosure uses a patterned plurality (e.g., an array, a grid, a lattice, an annulus, a rectangular arrangement or some other layout around a periphery, or the like) of beam sources (e.g., LEDs, lasers, radio frequency transmitters, or other energy producing devices) and a corresponding one or more beam detectors (e.g., photodiodes, antennas, or other energy detection devices). The beam detection system is arranged to concurrently detect the relative energy intensity on the one or more detectors from the one or more beam sources. In one embodiment, a plurality of light sources is pulsed in one or more patterns (e.g., separate patterns for each source, distinguishable patterns of a plurality of sources, a combined pattern produced by one or more sources, or the like). In the embodiment, the detection system is arranged to individually detect different light patterns even in the presence of any ambient light and other noise, and the detection system is further arranged to distinguish each individual light source from each other individual light source.

In some embodiments, a control circuit 128 receives data representing energy detected by a detector module 120, which may include one or more detector devices. The control circuit 128 may be integrated with the detectors, physically remote from the detectors, or communicatively associated with the detectors in any useful manner. The control circuit 128 is arranged to compare the relative energy intensities from each of the one or more detectors against a one or more values (e.g., a predefined database, a database that may either be pre-loaded or adapted during use via a predefined algorithm, or some other data repository). In some cases, the energy intensity values are normalized, corrected for ambient light or other noise, or suitably processed to enable the comparing functions. The control circuit 128 compares the relative energy intensity values to certain parameters that represent, for example, a distance from a detector to the PV array module 138, a size of a foreign object, a distance of a foreign object from a detector, or some other parameter. In these cases, the control circuit 128 executes a comparing algorithm to determine whether a foreign object is in or near a region of hazard such as the high energy beam 112. One or more control signals may then be generated from the output of the comparing algorithm and communicated to a safety control mechanism.

In some embodiments, parameters applied in the comparing algorithm are set relative to an average energy detected over one or more beams, an average energy detected or predicted over one or more emitters, an average energy detected by each sensor, an average energy detected over one or more sensors for each emitter, or by some other determination. In some embodiments, parameters applied in the comparing algorithm are set to an accumulated average of energy detected over a determined period of time from a detected signal (e.g., recent time). In some cases, such averaging or other normalization, accumulation, or mathematical processing corrects for distance and uniform attenuation caused by atmospheric effects or other factors.

In some cases, the threshold for detection of a change in detected energy is a fixed ratio relative to the average. In some cases, the threshold for detection of a change in detected energy is a statistical value such as a fixed number of standard deviations away from the average. In still other cases, the threshold for detection of a change in detected energy is determined in some other way.

Embodiments of the present safety systems that employ an optical intensity profile carry out at least one method that includes the acts of measuring relative intensities between various detectors and measuring at least one first derivative with respect to time, with respect to a relative change over a specified time duration, or with respect to both time and a relative change over a specified time duration (e.g., 200 microseconds (µs), 500 µs, 1 millisecond (ms), 10 ms, 50 ms, 100 ms, 500 ms, or some other time). In these embodiments, different time durations can be based on measured, expected, or predicted travel speeds of different objects. In addition, or in the alternative, different time durations can also be based on measured, expected, or predicted sizes of objects, object opacity, or any other object characteristics. For example, it is recognized that most birds will fly at a speed of at least 5 to 10 meters per second (m/s), and some birds can fly much faster (e.g., 50 m/s or faster). It is also recognized that humans walk 1 to 2 m/s and run 6 to 8 m/s. As such, a control circuit of the safety system may be configured to detect or otherwise identify specific shapes of first derivative curves based on the measured, expected, or predicted travel speeds of different objects.

The one or more methods employed in embodiments of the present safety systems that employ an optical intensity profile optionally include further acts. For example, in some cases, one or more second derivatives may be measured or otherwise calculated with respect to time. The second derivatives may be generated to verify a direction of change (i.e., determine/verify if a change in intensity is going to continue or reverse). The second derivatives may be generated as additional factor to distinguish between false signals such as noise having an intensity change that is fluctuating back and forth, and true signals caused by an unexpected object encroaching on a coded signal formed in proximity to a region of hazard such as a high energy beam 112.

FIGS. 5A-5I illustrate plotted data representing signals measured with a detector module 120. The signals measured by a detector module 120 may be coded signals 142 as illustrated in FIG. 4, however, it is recognized that coded signal 142 may simply be an energy (e.g., light) source that does not convey any additional information. The exemplary plots may be used in cooperation with optical intensity profile information to detect one or more objects affecting one or more coded signals 142 directed from an emitter module 140 toward a detector module 120. While an emitter module 140 is illustrated in FIG. 4 associated with receiver 116 and detector module 120 is illustrated in FIG. 2 associated with transmitter portion 102, this configuration is exemplary. In other embodiments, one or more emitter modules 140 may be associated with a transmitter portion 102, with both a transmitter portion 102 and a receiver 116, or in some other configuration. Along these lines, in some embodiments, one or more detector modules 120 may be associated with a receiver 116, with both a transmitter portion 102 and a receiver 116, or in some other configuration. For example, in some embodiments, emitters and detectors are co-located at the transmitter portion 102, the receiver 116, or both the transmitter portion 102 and the receiver 116. In these embodiments, retro-reflectors or another means is used to cooperatively direct or redirect one or more coded signals 142 between an emitter and corresponding detector.

In each of the plots of FIGS. 5A-5I, a vertical axis represents beam intensity J of one or more coded signals 142 produced by one or more emitters and measured, calculated, or otherwise generated by one or more detectors. In the plots of FIGS. 5A-5I, the horizontal access N represents data from N detectors over time. In the plot of FIG. 5F, the horizontal axis represents a distance X between an emitter of a coded signal and a detector of the coded signal. In the plot of FIG. 5G, the horizontal axis represents a misalignment theta (θ) of one or more emitter/detector pairs, and in plots FIGS. 5H and 5I, the horizontal axis represents time t and a single emitter providing a single coded signal 142 to a single detector.

FIG. 5A illustrates measurements of data collected from detectors arranged to receive coded signal information from one or more corresponding emitters at or during a certain time $t_0$. In the embodiment, the one or more detectors and emitters are fixed in time and position, and the system is operating in a steady state with no objects detected. Generally speaking, the "noisy horizontal line" of FIG. 5A represents detector output data with minor variations for atmospheric changes, variations in emitter and detector performance, electronic data accumulation and processing, and the like. Data from the plot of FIG. 5A may be used in cooperation with optical intensity profile information to determine that no object is in, near, or otherwise affecting the associated one or more coded signals, and as such, no object is approaching or near the region of hazard (e.g., a high energy beam 112).

FIG. 5B illustrates another plot of measurements of data collected from detectors arranged to receive coded signal information from one or more corresponding emitters. Along the lines of FIG. 5A, one or more detectors and emitters are fixed in time and position, and when the data is analyzed by comparing the data to one or more profile data sets, no object would be detected. The plot of FIG. 5B shows that the detected energy intensity per detector has a smooth and substantially sinusoidal variation. The sinusoidal-like variation may be caused by the relative geometry between one emitter and the various detectors, by local atmospheric or environment-based conditions, or by another one or more factors.

FIGS. 5C-5G represent additional plots of data measurements collected from one or more corresponding emitters and detectors along the lines of safety systems associated with FIGS. 5A and 5B. In the associated systems, the emitters and detectors are fixed in position and time.

In FIG. 5C, a substantially horizontal plot with minor noise variations is interrupted by an anomalous reduction of beam intensity. The area of reduced beam intensity at a particular time is caused by an object entering, blocking, reflecting, impinging, or otherwise affecting the opportunity of one or more detectors to receive a coded signal. In the plot of FIG. 5C, a particular comparison, profile, algorithm, or other mechanism may determine that the object of interest is relatively small based on one or more particular factors such as the amount of intensity reduction, the aggressiveness of the intensity reduction, the number of detectors that are affected, the "shape" of the plotted data, the duration of the anomaly, or by some other one or more factors.

The plot of FIG. 5D includes a larger and less aggressive reduction in beam intensity J than the plot of FIG. 5C. As such, the plot of FIG. 5D may indicate that object of interest associated with FIG. 5D is larger than the object associated with FIG. 5C. In addition, or in the alternative, the plot of FIG. 5D may indicate that more detectors are affected detectors, or the plot may indicate some other information.

In FIG. 5E, an object of interest is near one or more coded signals, but the object is not interrupting the coded signals. Instead, the object is reflecting one or more coded signals causing an increase in detected energy by one or more detectors. The plot of FIG. 5E may be compared and contrasted to the plot of FIG. 5B. In FIG. 5E, the increase in detected energy is represented by an intensity per detector plot that is presented is as a substantially smooth sine curve with an elevated bump around one or more detectors.

The plot of FIG. 5F is formed with data from a single detector. The plot illustrates that no object is affecting the coded signal, and that a beam intensity versus distance, due to separation between the emitter and detector, has a decreasing curve (e.g., $1/X^2$ wherein "X" is distance).

The plots of FIGS. 5G-5I illustrate data collected from one detector paired with a respective single emitter. In the plot of FIG. 5F, no objects of interest are detected, though an intensity versus misalignment angle between the emitter and detector is represented by a smooth curve having a local maximum. In the plot of FIG. 5H, no objects of interest are detected, but particular factors may change over time such as the separation distance between the emitter and detector, ambient light, weather, accumulating debris on one or both of the emitter and detector, or any other factors. The change or changes can lead to a slowly-changing level of energy sensed by each detector. In the plot of FIG. 5I, an object of interest enters the path between an emitter and detector and substantially blocks some or all of the coded signal energy from reaching the detector. In FIG. 5I, the aggressive reduction in beam intensity followed by the aggressive increase in beam intensity may indicate a quickly moving object that passes into a coded beam, through the coded beam, and back out of the coded beam.

FIGS. 6A-6E illustrate plotted data and other information representing analysis according to an optical intensity profile embodiment. An exemplary method according to the optical intensity profile embodiment will also be described. In the method, data illustrated in FIGS. 6A-6E will be analyzed and a determination that an object is approaching a high energy beam 112 will be described.

With respect to FIGS. 6A-6E, for example, a plurality of emitters and a corresponding plurality of detectors are provided at some determined distance from each other. The plurality of emitters are associated with an emitter module 140 (FIG. 4) and controlled by a control circuit 148 (FIG. 4), and the plurality of detectors are associated with a detector module 120 and controlled by a control circuit 128 (FIGS. 2 and 4).

In the embodiment described with respect to FIGS. 6A-6E, the emitter module 140 controls 16 emitters arranged in a circular pattern around a high energy beam 112. Each emitter is configured to produce a control signal 142. Further in the embodiment, the detector module 120 controls 16 detectors. Each of the 16 detectors is aligned with a corresponding one of the 16 emitters, and each detector is positioned a determined distance from its corresponding emitter. The control circuit 128, via the detector module 120, controls each of the plurality of detectors, and each detector is configured to detect and process energy from its corresponding emitter. Also in the present embodiment, the control circuit 128 and control circuit 148 are time synchronized. In addition, each of the 16 emitters pulses in sequence. After one cycle of each of the 16 emitters pulsing, the sequence repeats. In other embodiments, the emitters may produce an associated beam or field of energy according to some other pattern, format, or scheme.

Each of FIGS. 6A-6E illustrates a full sequence of 16 emitter pulses. Considering the energy detected by one particular detector as emitters around the circular pattern are sequentially pulsed, the energy signal detected by the particular detector grows weaker until the furthest emitter is pulsed, and then the energy signal detected by the particular detector grows stronger until the closest emitter (i.e., the emitter corresponding to the particular detector) is pulsed. That is, because the 16 emitters and 16 detectors in the present embodiment are arranged in a circular pattern, the emitters that are farther away from the particular detector instantiate weaker detected signals in the particular detector, while emitters that are closer to the particular detector instantiate stronger signals in the particular detector.

Figure 6A:
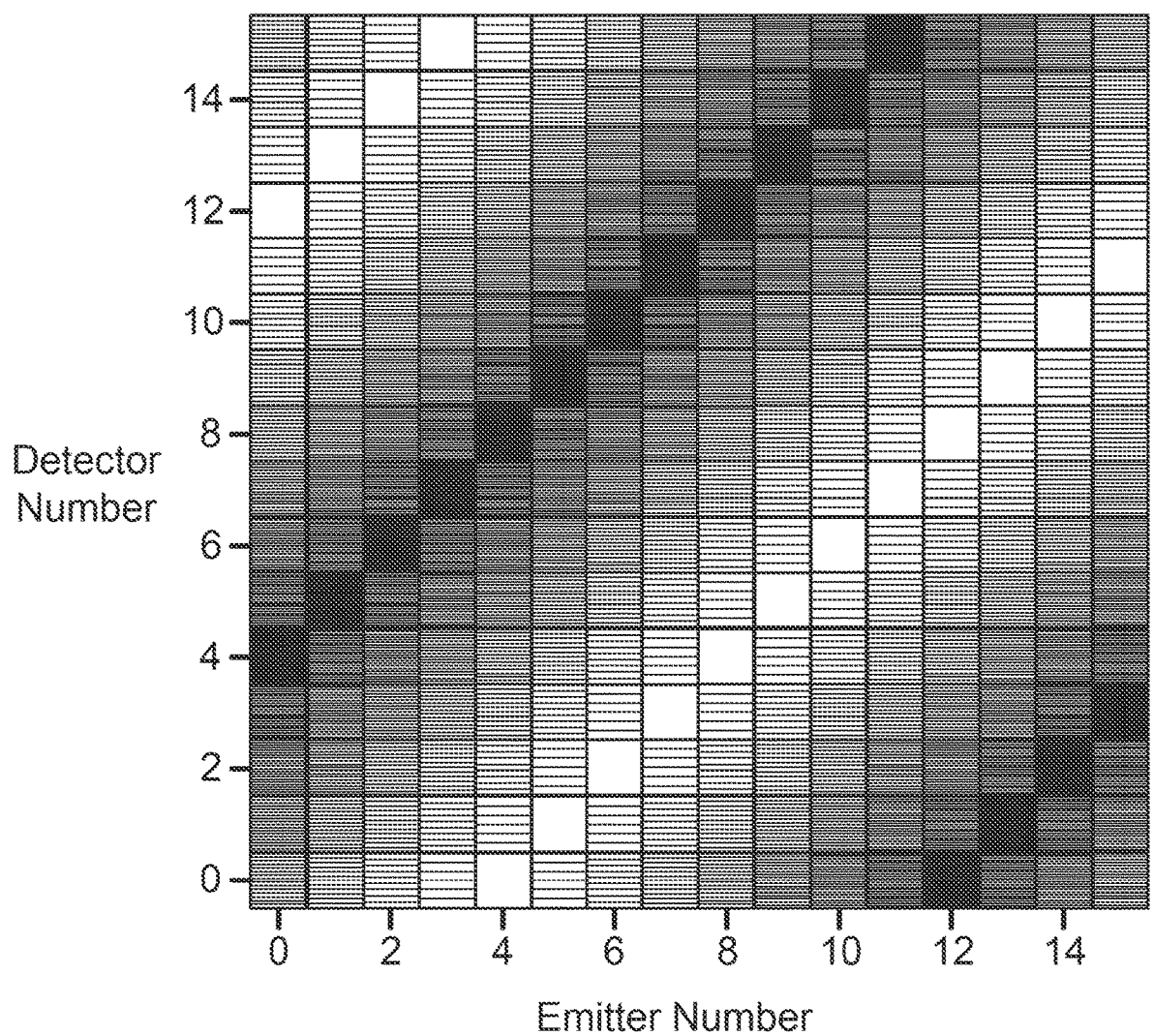
FIGS. 6A-6E illustrate plotted data and other information representing analysis according to an optical intensity profile embodiment.

In FIG. 6A, a heat-map graph illustrates one conceivable scenario in which the relative signal strength at each of the 16 detectors is detected and processed during a sequence of 16 pulses (i.e., one pulse from each of 16 emitters). In the graph of FIG. 6A, a vertical axis represents data associated with each of the 16 detectors, and a horizontal axis represents data associated with each of the 16 emitters. Also in the illustration of FIG. 6A, a lighter area indicates a strong signal, a grey area indicates a mid-strength signal, and a dark area indicates a low-strength signal received at the associated detector. Considering Detector #4, for example, it is shown in FIG. 6A that the intersection of Emitter #4 and Detector #4 produces a strongest detected signal as evidenced by the light area, and the intersection of Emitter #4 and Detector #12 produces a weakest detected signal as evidenced by the dark area. Similar analysis can be made with other pairs of emitters and detectors in FIG. 6A. In operation of the safety system, a graphable pattern of detected and processed intensity data associated with the plurality of detectors and emitters and changing over time may be further processed to detect an object approaching the high energy power beam 112.

The graphs of FIGS. 6B-6E illustrate a progressive scenario wherein no objects are in the vicinity of the emitters and detectors at a first time, and then at a second time and a third time, a small object intrudes into the ring of guard beams (i.e., control signals 142) around the high energy beam 112. The unknown object is larger than one detector and smaller than a spacing between a small number of detectors (e.g., 3 detectors, 5 detectors, 7 detectors, or some other number of detectors). In the scenario, as shown in FIGS. 6B-6E, the unknown object is roughly aligned with Detector #4, and the object is likely closer to the detectors of detector module 120 than it is to the emitters of emitter module 140.

Figure 6B:
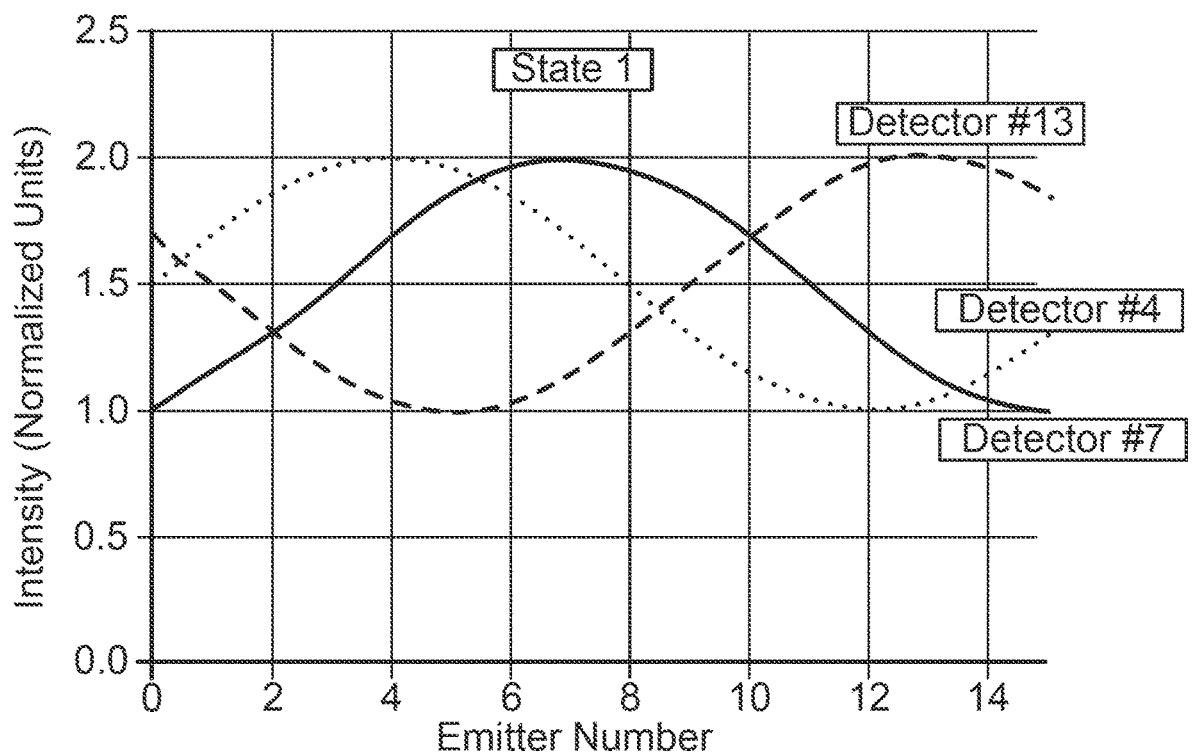
Figure 6C:
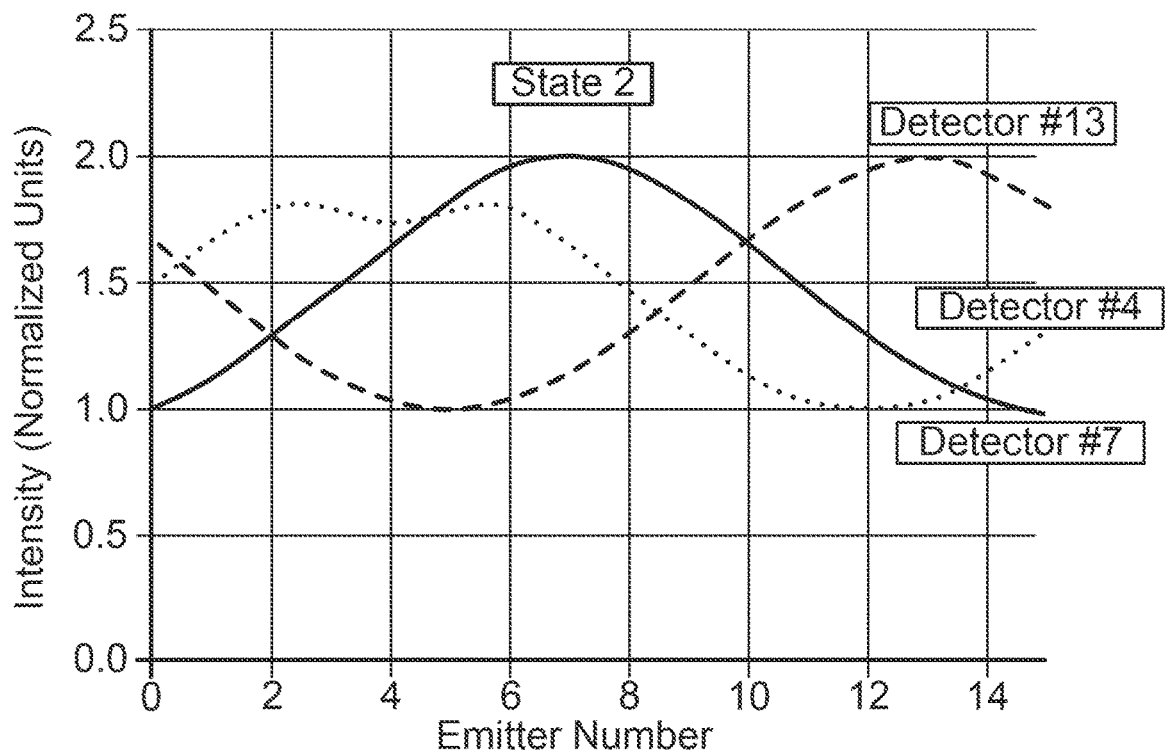
Figure 6D:
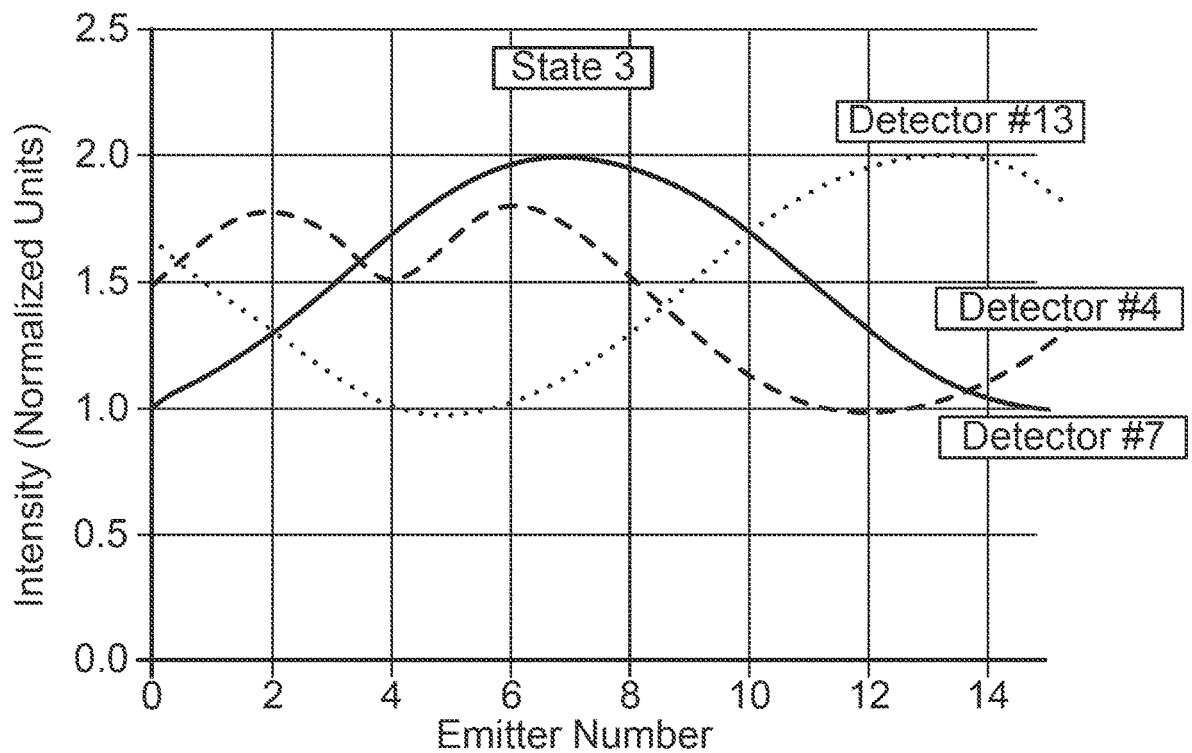

Graphs in FIGS. 6B-6D show a certain signal strength at three detectors (i.e., Detectors #4, #7, and #13). The three detectors are selected for purposes of discussing the exemplary embodiment, however, it is understood that data for each other detector may also be analyzed. In each of the three graphs of FIGS. 6B-6D, data is detected, processed, and plotted for a full sequence of 16 emitter pulses; one pulse from each emitter aligned with a corresponding detector.

In FIG. 6B, a first full sequence of 16 emitter pulses is regarded as "State 1." In State 1, the unknown object has not yet intruded upon any of the 16 control signals 142. As such, a "normal" profile for each of the detectors is plotted. That is, as emitters around the circular pattern are pulsed, the energy signal detected by a particular detector grows weaker until the furthest emitter is pulsed, and then the energy signal detected by the particular detector grows stronger until the closest emitter (i.e., the emitter corresponding to the particular detector) is pulsed. Stated differently for purposes of the example, because the 16 emitters and 16 detectors are arranged in a circular pattern, the emitters that are farther away from a particular detector will instantiate weaker detected signals in the particular detector, and emitters that are closer to the particular detector will instantiate stronger signals in the particular detector. Since no object is yet detected at State 1, the detected signals associated with each of the three represented detectors (i.e., Detectors #4, #7, and #13) will follow a substantially sinusoidal pattern corresponding to the 16 emitter pulses. It is noted that both FIGS. 6A and 6B correspond to data associated with State 1, FIG. 6C illustrates data associated with the three represented detectors (i.e., Detectors #4, #7, and #13) when an object is beginning to enter a path between Emitter #4 and Detector #4. FIG. 6C is regarded as "State 2." In State 2, the object has started to intrude, but the object does not yet fully block the energy from Emitter #4 to Detector #4, and the illustrated result is a decreased signal strength detected at Detector #4 and possibly a changed signal strength (i.e., reduced or increased) at detectors near to Detector #4 caused by the partial blockage or reflections from the object.

FIG. 6D is regarded as "State 3." Along the lines just discussed with respect to FIG. 6C, the data illustrated in FIG. 6D is detected and processed when the unknown object has intruded further into the path formed between Emitter #4 and Detector #4. As shown in FIG. 6D, the intensity of energy detected by Detector #4 has been reduced, and the detected intensity is about 20 percent of what is otherwise predicted based on a steady state.

Figure 6E:
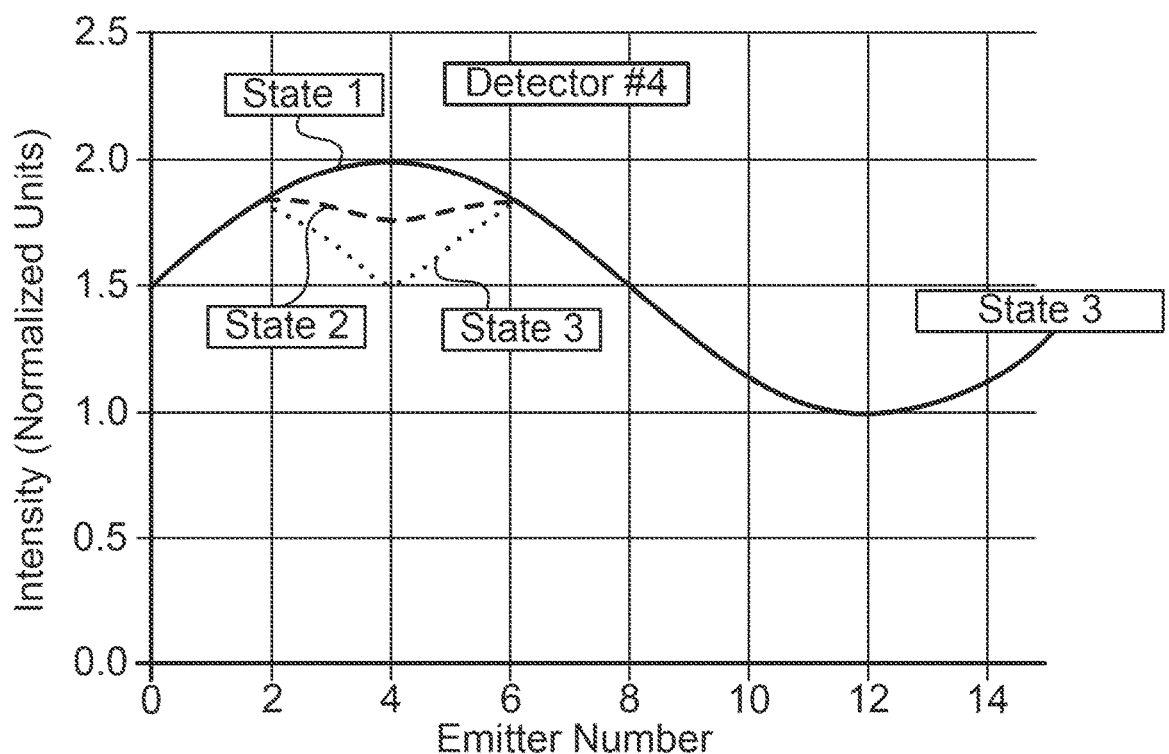

FIG. 6E illustrates collected data associated only with Detector #4. In FIG. 6E, the signal intensity detected at Detector #4 in each of State 1, State 2, and State 3 is superimposed on a single graph. In this way, it is shown that an object entering a path between an emitter and associated detector can be perceived and detected based on measured signal intensity data. It is further understood then that by analyzing, mapping, profiling, or otherwise calculating actual and generated data, nearly any object of any size and shape that enters an area of hazard can be detected and possibly identified.

Figure 7:
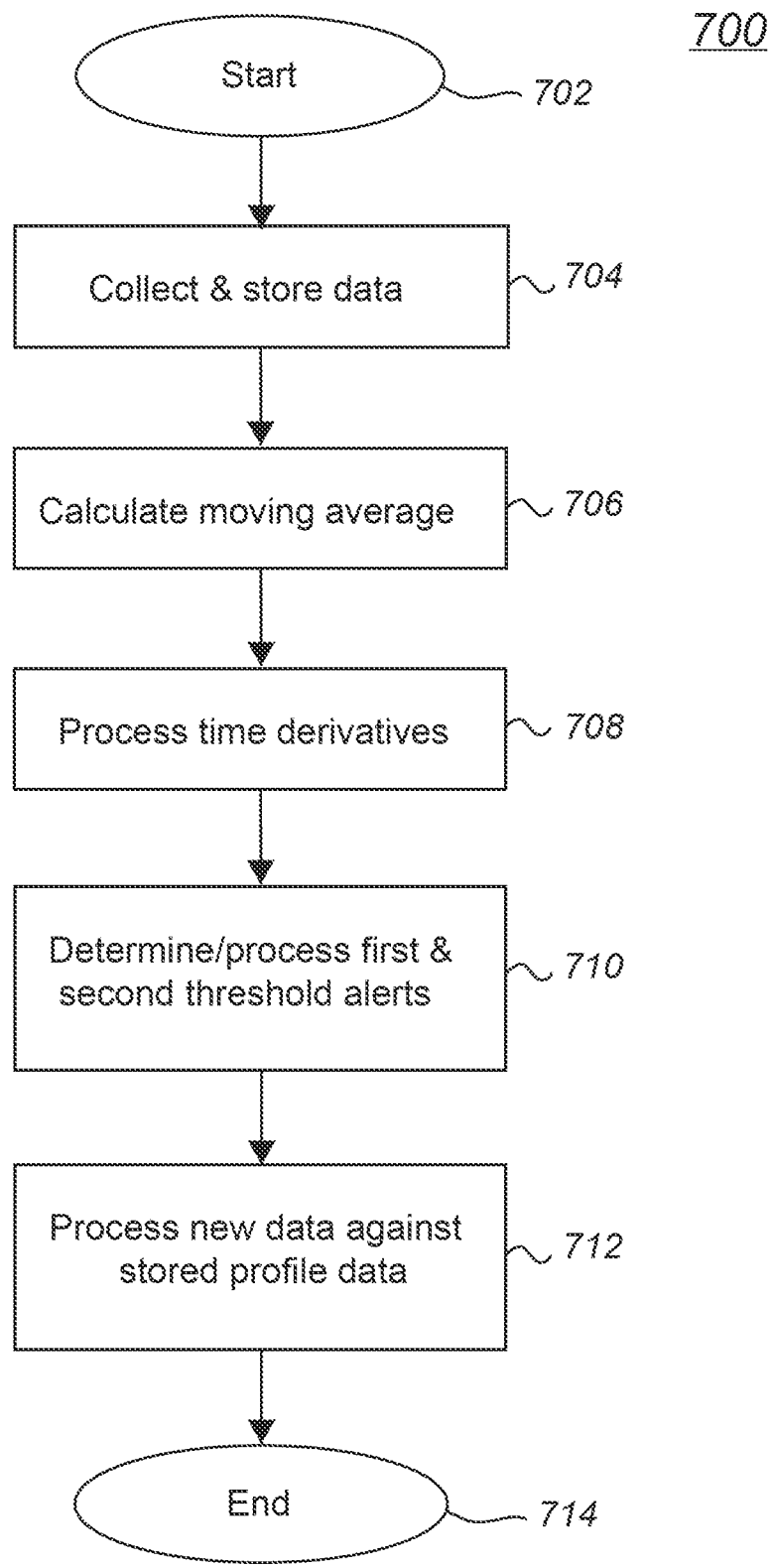
FIG. 7 is an exemplary method according to the optical intensity profile embodiment with respect to FIGS. 6A-6E.

In FIG. 7, an exemplary method according to the optical intensity profile embodiment and with respect to FIGS. 6A-6E is now described. In the example, a particular object detection algorithm 700 includes a plurality of acts. Processing of the algorithm begins at 702.

In a first act at 704, a record of data from the past N sequences of emitter pulses is stored. In the act, N corresponds to a longer time period than what corresponds to a predicted intrusion speed of any particular object. For example, if the individual emitters and detectors are formed to be one centimeter (1 cm) in diameter, and if each sequence of pulses occurs over 0.5 milliseconds, and if objects are predicted to travel at 1 meter per second (m/s), then a characteristic time N would be 10 milliseconds, and data might be kept for 50 milliseconds, which corresponds to a running storage window of 100 sequences.

In a second act at 706, a moving average of the amplitude (i.e., energy intensity) detected by each detector in association with each emitter pulse is stored. The moving average will generally cover a longer time duration than the data record from the first act. For example, the moving average may cover one or two seconds, dozens of seconds, several minutes, or some other period of time.

In a third act at 708, the time derivative of each detector with respect to each emitter between every pair of sequences is calculated. In addition, the average of the time derivative over multiple sequences, such as an average every 3 time derivatives, is also calculated. The calculated time derivative data and the calculated average data are stored.

In a fourth act at 710, if it is determined that a time derivative crosses a determined first threshold (e.g., if the intensity falls by more than a given fraction of the moving average) within a determined first time duration (e.g., 3 milliseconds) then a first alert may be generated. The first alert may direct additional processing, additional data storage, output signaling, data capture, a control signal used to trip a safety interlock, or some other action.

In a fifth act also at 710, if the calculated time derivative of a number of adjacent detectors each crosses a determined second threshold (e.g., if the intensity falls by more than a given fraction of the moving average) within a determined second time duration (e.g., 3 milliseconds), then the first alert or a different second alert may be generated. The generated alert may direct the actions associated with the first alert or the generated alert may direct other responsive actions. In this fifth act, the determined second threshold (e.g., the fraction of the moving average) may be the same or different from the first threshold. In this way, any individual detector does not have to achieve a first threshold and instead, a plurality of detectors may achieve a different (e.g., smaller) threshold.

In one or more additional acts at 712, data that is detected, calculated or otherwise generated may be compared with stored profile data such that particular changes in detected energy intensities may be pattern mapped to provide further information such as prediction information associated with one or more detected objects.

Certain words and phrases used in the present disclosure are set forth as follows. The terms "include" and "comprise," as well as derivatives thereof, mean inclusion without limitation. The term "or," is inclusive, meaning and/or. The phrases "associated with" and "associated therewith," as well as derivatives thereof in all grammatical forms, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation, such a device may be implemented in hardware, firmware, or software, or some combination of at least two of the same. The functionality associated with any particular controller may be centralized or distributed, whether locally or remotely. Other definitions of certain words and phrases may be provided within this patent document. Those of ordinary skill in the art will understand that in many, if not most instances, such definitions apply to prior as well as future uses of such defined words and phrases.

Where one or more figures included in the present disclosure illustrates a data flow diagram, the illustrated process is a non-limiting process that may be used by embodiments of high energy power beam or field systems. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

The figures in the present disclosure illustrate portions of one or more non-limiting computing device embodiments such as laser based system embodiment 100. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processors, such as processor 124 described herein, include central processing units (CPU's), microcontrollers (MCU), digital signal processors (DSP), application specific integrated circuits (ASIC), and the like. The processors interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, embodiments describe software executable by the processor and operable to execute certain ones of the method acts.

As known by one skilled in the art, a computing device has one or more memories such as memory 126, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor.

The computing devices illustrated herein may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity.

When so arranged as described herein, each computing device may be transformed from a generic and unspecific computing device to a combination device comprising hardware and software configured for a specific and particular purpose.

Database structures, if any are present in the laser based system embodiment 100 or in other embodiments, may be formed in a single database or multiple databases. In some cases hardware or software storage repositories are shared amongst various functions of the particular system or systems to which they are associated. A database may be formed as part of a local system or local area network. Alternatively, or in addition, a database may be formed remotely, such as within a "cloud" computing system, which would be accessible via a wide area network or some other network.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like.

In at least one embodiment, devices such as transmitter portion 102 may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, WiFi, Worldwide Interoperability for Microwave Access (WiMax), or the like.

In some cases, the memory 126 is a non-transitory computer readable medium (CRM). The CRM is configured to store computing instructions executable by a processor 124 of the transmitter portion 102. The computing instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of a laser based system embodiment 100.

Buttons, keypads, computer mice, memory cards, serial ports, bio-sensor readers, touch screens, and the like may individually or in cooperation be useful to an operator of the laser based system embodiment 100. The devices may, for example, input control information into the system. Displays, printers, memory cards, LED indicators, temperature sensors, audio devices (e.g., speakers, piezo device, etc.), vibrators, and the like are all useful to present output information to the operator of the laser based system embodiment 100. In some cases, the input and output devices are directly coupled to the transmitter portion 102 and electronically coupled to a processor 124 or other operative circuitry. In other cases, the input and output devices pass information via one or more communication ports (e.g., RS-232, RS-485, infrared, USB, etc.)

As described herein, for simplicity, a user of the laser based system embodiment 100 may in some cases be described in the context of the male gender. It is understood that a user can be of any gender, and the terms "he," "his," and the like as used herein are to be interpreted broadly inclusive of all known gender definitions.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

As used in the present disclosure, the term "module" refers to an application specific integrated circuit (ASIC), an electronic circuit, a processor and a memory operative to execute one or more software or firmware programs, combinational logic circuitry, or other suitable components (i.e., hardware, software, or hardware and software) that provide the functionality described with respect to the module.

A processor (i.e., a processing unit), as used in the present disclosure, refers to one or more processing units individually, shared, or in a group, having one or more processing cores (e.g., execution units), including central processing units (CPUs), digital signal processors (DSPs), microprocessors, micro controllers, state machines, and the like that execute instructions. In the present disclosure, the terms processor in any of its grammatical forms is synonymous with the term controller.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

As known by one skilled in the art, a computing device such as a computing server has one or more memories, and each memory comprises any combination of transitory and non-transitory, volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. Some or all of the stored contents of a memory may include software instructions executable by a processing device to carry out one or more particular acts.

The terms, "real-time" or "real time," as used interchangeably herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds, milliseconds, seconds, minutes or some other time frame as the context of the term's use implies), and that the activity may be performed on an ongoing basis (e.g., stopping the transmission of a high energy power beam or field). An example of an activity that is not real-time is one that occurs over an extended period of time (e.g., hours, days, weeks, months, years, or some other time frame as the context of the term's use implies) or that occurs based on intervention or direction by a person or other activity.

Unless the context requires otherwise, throughout the specification and claims which follow, the word "comprise" and variations thereof, such as, "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

The headings and Abstract of the Disclosure provided herein are for convenience only and do not limit or interpret the scope or meaning of the embodiments The various embodiments described above can be combined to provide further embodiments. Aspects of the embodiments can be modified, if necessary to employ concepts of the various patents, application and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A power beaming system, comprising:

power beam circuitry to deliver electric power embodied in laser light beamed from a first location to a second location, the first and second locations being remote from each other, the laser light having at least two energy intensity levels, including a high energy intensity level and a low energy intensity level;

guard circuitry having at least one emitter configured to emit one or more guard beams and at least one detector corresponding to the at least one emitter, wherein the guard circuitry is arranged to form a detection area about the laser light, wherein the detection area is subdivided into a plurality of detection areas, and wherein the guard circuitry is arranged to detect one or more objects in proximity to the laser light;

a controller configured to activate the guard circuitry and the power beam circuitry according to a plurality of sequentially activated safety modes, the controller executing instructions to:

activate a first safety mode configured to set parameters of the guard circuitry to operate a first guard beam of the one or more guard beams with a first nominal ocular hazard distance to scan a first of the plurality of detection areas to detect objects;

in response to determining that the first of the plurality of detection areas is clear of objects, activate a second safety mode configured to set parameters of the guard circuitry to emit a second guard beam of the one or more guard beams with a larger second nominal ocular hazard distance to scan a second of the plurality of detection areas to detect objects, wherein the scanning of the second area involves an unsafe amount of light in the first area;

in response to determining that the first and second of the plurality of detection areas are clear of objects, activate the laser light with the high energy intensity level.

2. A power beaming system according to claim 1 wherein the energy intensity level of the laser light is determined at least in part by a voltage, a current, or the voltage and the current applied to produce the laser light.

3. A power beaming system according to claim 1 wherein the power beam circuitry includes a transmitter module arranged to produce a laser light beam that is controllably aimed at a fixed position laser light receiver, controllably tracked to a moving laser light receiver, or controllably directed in a scanning pattern.

4. A power beaming system according to claim 1 wherein the energy intensity level is determined at least in part by controlling at least one of average power, peak power, duty cycle, or pulse width of the beamed laser light.

5. A power beaming system according to claim 1 wherein the energy intensity level is controlled at least in part by reducing output flux of the beamed laser light, by increasing a diameter of the beamed laser light, or by increasing a divergence of the beamed laser light.

6. A power beaming system according to claim 1 wherein the energy intensity level of the beamed laser light is determined at least in part by a wavelength of light produced by the power beam circuitry.

7. A power beaming system according to claim 1 wherein the power beam circuitry includes: a laser light receiver to receive the beamed laser light, wherein the laser light receiver includes at least one photovoltaic structure.

8. A power beaming system according to claim 7 wherein circuitry of the laser light receiver forms at least part of the at least one detector of the guard circuitry.

9. A power beaming system according to claim 1 wherein the power beaming system is at least one of a Light Detection and Ranging (LIDAR) system, a Doppler LIDAR system, a remote chemical sensor system, laser communications system, and a laser power beaming system.

* * * * *